(12) United States Patent
Mishra et al.

(10) Patent No.: US 11,509,572 B2
(45) Date of Patent: *Nov. 22, 2022

(54) OPTIMIZING IP MULTICAST DELIVERY WITH USE OF LOCAL SOURCE NODES AND THE PROPAGATION OF ADVERTISEMENTS THEREFOR

(71) Applicant: Cisco Technology, Inc., San Jose, CA (US)

(72) Inventors: Mankamana Prasad Mishra, Dublin, CA (US); Pascal Thubert, la colle sur Loup (FR); Ijsbrand Wijnands, Leuven (BE); Krishnaswamy Ananthamurthy, San Ramon, CA (US); Ramakrishnan Chokkanathapuram Sundaram, Fremont, CA (US); Stig Ingvar Venaas, Oakland, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 79 days.

This patent is subject to a terminal disclaimer.

(21) Appl. No.: 17/038,204

(22) Filed: Sep. 30, 2020

(65) Prior Publication Data
US 2021/0014159 A1     Jan. 14, 2021

Related U.S. Application Data

(63) Continuation of application No. 16/268,953, filed on Feb. 6, 2019, now Pat. No. 10,855,579.

(51) Int. Cl.
*H04L 12/28*     (2006.01)
*H04L 45/00*     (2022.01)
(Continued)

(52) U.S. Cl.
CPC ............ *H04L 45/34* (2013.01); *H04L 45/021* (2013.01); *H04L 45/16* (2013.01); *H04L 45/38* (2013.01); *H04L 45/48* (2013.01); *H04L 45/741* (2013.01)

(58) Field of Classification Search
CPC ....... H04L 12/18; H04L 12/44; H04L 12/185; H04L 12/1863; H04L 12/1886;
(Continued)

(56) References Cited

U.S. PATENT DOCUMENTS 6,154,463 A    11/2000   Aggarwal et al.
7,925,778 B1    4/2011   Wijnands et al.
(Continued)

OTHER PUBLICATIONS

IJ. Wijnands et al., "PIM Flooding Mechanism (PFM) and Source Discovery (SD)", Internet Engineering Task Force (IETF), Request for Comments: 8364, Category: Experimental, ISSN: 2070-1721, Mar. 2018, 18 pages.
(Continued)

*Primary Examiner* — Frank Duong
(74) *Attorney, Agent, or Firm* — Edell, Shapiro & Finnan, LLC

(57) ABSTRACT

In one illustrative example, a network node connected in a network fabric may identify that it is established as part of a multicast distribution tree for forwarding multicast traffic from a source node to one or more host receiver devices of a multicast group. In response, the network node may propagate in the network fabric a message for advertising the network node as a candidate local source node at which to join the multicast group. The message for advertising may include data such as a reachability metric. The propagation of the message may be part of a flooding of such messages in the network fabric. The network node serving as the candidate local source node may thereafter "locally" join a host receiver device in the multicast group at the network
(Continued)

node so that the device may receive the multicast traffic from the source node via the network node.

20 Claims, 19 Drawing Sheets

(51) Int. Cl.
*H04L 45/16* (2022.01)
*H04L 45/741* (2022.01)
*H04L 45/021* (2022.01)
*H04L 45/48* (2022.01)

(58) Field of Classification Search
CPC ... H04L 12/189; H04L 12/725; H04L 12/761; H04L 12/773; H04L 45/021; H04L 45/16; H04L 45/18; H04L 45/30; H04L 45/34; H04L 45/38; H04L 45/48; H04L 45/50; H04L 45/60; H04L 45/74; H04L 45/741; H04W 72/005
See application file for complete search history.

(56) References Cited

U.S. PATENT DOCUMENTS

| | | | |
|---|---|---|---|
| 8,099,516 | B1 | 1/2012 | Cai |
| 9,030,926 | B2 | 5/2015 | Han et al. |
| 9,853,822 | B2 | 12/2017 | Wijnands et al. |
| 2006/0018253 | A1* | 1/2006 | Windisch ............... H04L 45/60 370/216 |
| 2006/0268869 | A1 | 11/2006 | Boers et al. |
| 2006/0291444 | A1 | 12/2006 | Alvarez et al. |
| 2007/0047556 | A1 | 3/2007 | Raahemi et al. |
| 2012/0257514 | A1 | 10/2012 | Allan et al. |
| 2014/0241351 | A1 | 8/2014 | Kollipara et al. |
| 2014/0254591 | A1 | 9/2014 | Mahadevan et al. |
| 2016/0006573 | A1 | 1/2016 | Wu et al. |
| 2016/0277199 | A1 | 9/2016 | Nagarajan et al. |
| 2017/0093695 | A1 | 3/2017 | Kebler et al. |
| 2018/0026870 | A1 | 1/2018 | Thubert et al. |
| 2020/0044957 | A1 | 2/2020 | Allan |

OTHER PUBLICATIONS

Roman Novak et al., "Steiner tree based distributed multicast routing in networks", Steiner Trees in Industries, Jan. 2000, 26 pages.
Wikipedia, "Steiner tree problem", https://en.wikipedia.org/wiki/Steiner_tree_problem, Dec. 26, 2018, 6 pages.
D. Farinacci et al., "Population Count Extensions to Protocol Independent Multicast (PIM)", Internet Engineering Task Force (IETF), Request for Comments: 6807, Category: Experimental, ISSN: 2070-1721, Dec. 2012, 15 pages.
B. Cain et al., "Internet Group Management Protocol, Version 3", Network Working Group, Request for Comments: 3376, Obsoletes: 2236, Category: Standards Track, Oct. 2002, 53 pages.
B. Fenner et al., "Protocol Independent Multicast—Sparse Mode (PIM-SM): Protocol Specification (Revised)", Network Working Group, Request for Comments: 4601, Obsoletes: 2362, Category: Standards Track, Aug. 2006, 112 pages.
IJ. Wijnands et al., "The Reverse Path Forwarding (RPF) Vector TLV", Network Working Group, Request for Comments: 5496, Category: Standards Track, Mar. 2009, 8 pages.
P. Levis et al., "The Trickle Algorithm", Internet Engineering Task Force (IETF), Request for Comments: 6206, Category: Standards Track, ISSN: 2070-1721, Mar. 2011, 13 pages.
D. Estrin et al., "Protocol Independent Multicast-Sparse Mode (PIM-SM): Protocol Specification", Network Working Group, Request for Comments: 2362, Obsoletes: 2117, Category: Experimental, Jun. 1998, 66 pages.

* cited by examiner

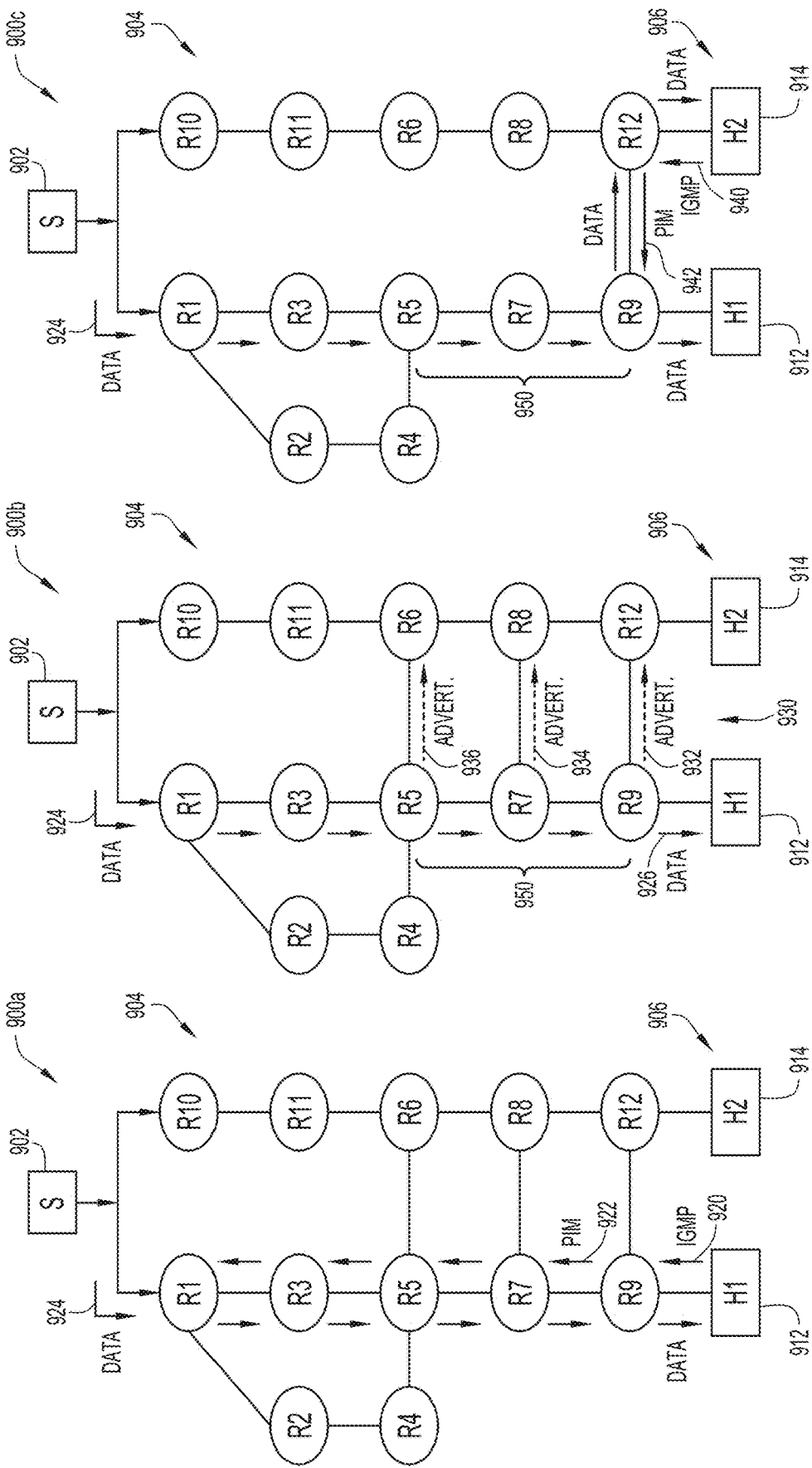

ESTABLISHMENT OF MULTICAST DISTRIBUTION TREE

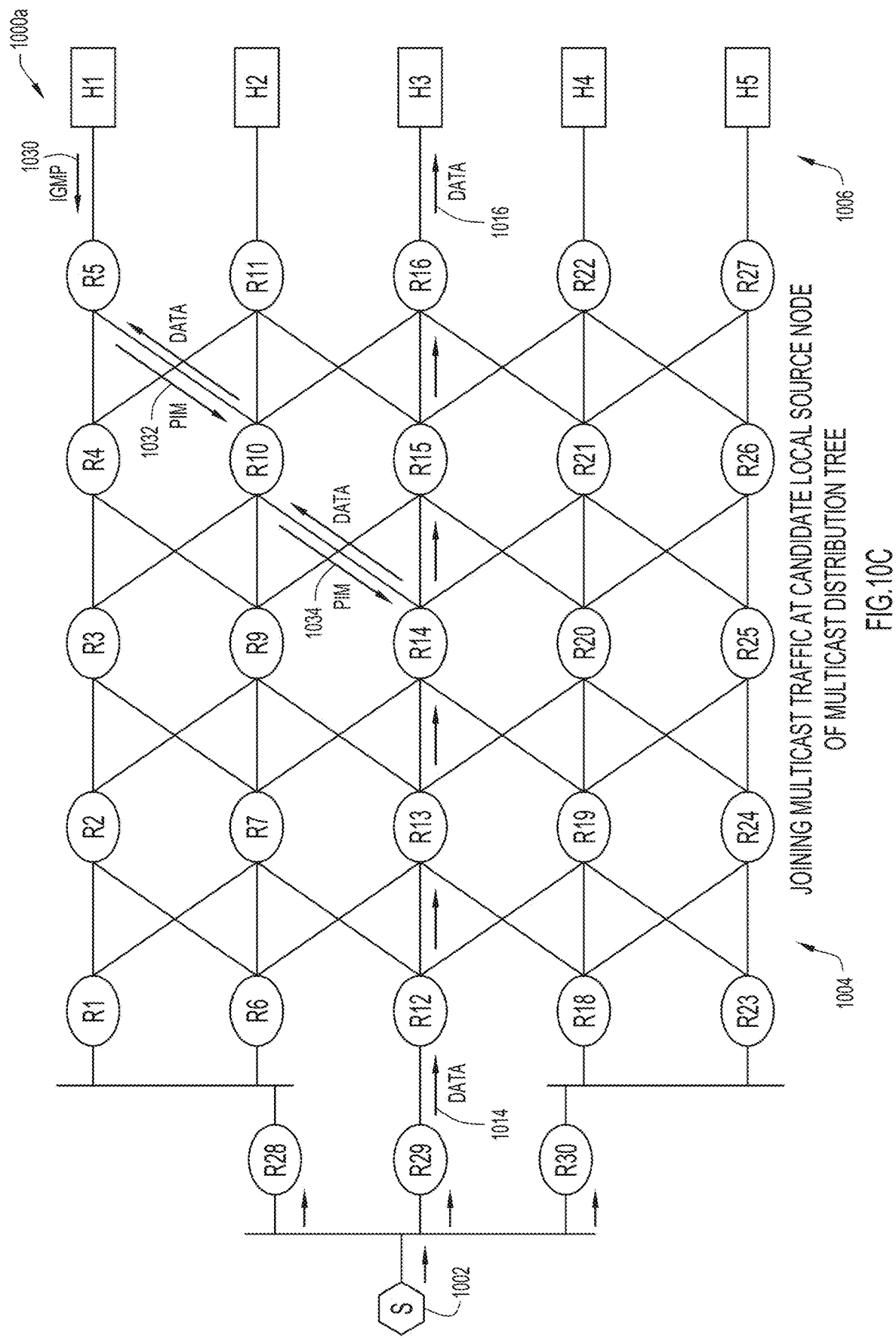
FIG.10C JOINING MULTICAST TRAFFIC AT CANDIDATE LOCAL SOURCE NODE OF MULTICAST DISTRIBUTION TREE

FLOODING MECHANISM TO ADVERTISE NEW CANDIDATE LOCAL SOURCE NODES AFTER JOINING

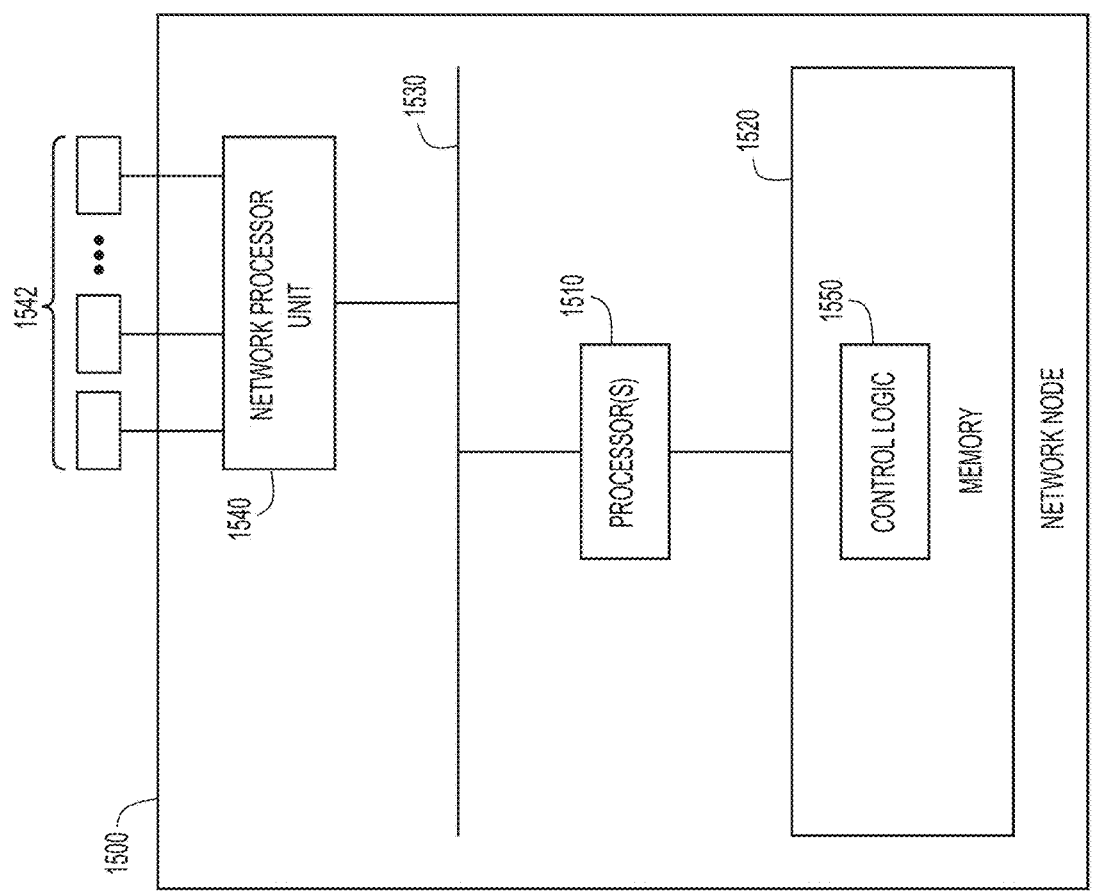

OPTIMIZING IP MULTICAST DELIVERY WITH USE OF LOCAL SOURCE NODES AND THE PROPAGATION OF ADVERTISEMENTS THEREFOR

CROSS-REFERENCE TO RELATED APPLICATIONS

This application is a continuation of U.S. patent application Ser. No. 16/268,953 filed Feb. 6, 2019, the entirety of which is incorporated herein by reference.

TECHNICAL FIELD

The present disclosure relates generally to IP multicast delivery for the communication of IP multicast traffic to a multicast group, and more particularly to the optimization of IP multicast delivery with the use of local source nodes at which to locally join the multicast group and the propagation of messages for advertising such local source nodes.

BACKGROUND

A network fabric may include a plurality of interconnected network nodes (e.g. routers) configured to facilitate the communication of IP multicast traffic from a source node to one or more host receiver devices. Natively, IP multicast is defined and designed to pull IP multicast traffic directly from source nodes. However, it is not always optimal to pull the IP multicast traffic from the source nodes directly.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 9A, 9B, and 9C are illustrative representations of a network fabric which includes a plurality of interconnected network nodes (e.g. routers) configured for IP multicast delivery according to some implementations of the present disclosure, for use in describing an example scenario that results in a more optimal multicast traffic delivery;

FIGS. 10A, 10B, 10C, and 10D are illustrative representations of a network fabric which includes a plurality of interconnected network nodes (e.g. routers) configured for IP multicast delivery according to some implementations of the present disclosure, for use in describing an example scenario that results in a more optimal multicast traffic delivery using techniques of the present disclosure;

FIG. 15 illustrates a block diagram of a network node (e.g. a router) configured to perform operations according to some implementations as described herein.

DESCRIPTION OF EXAMPLE EMBODIMENTS

Figure 1:
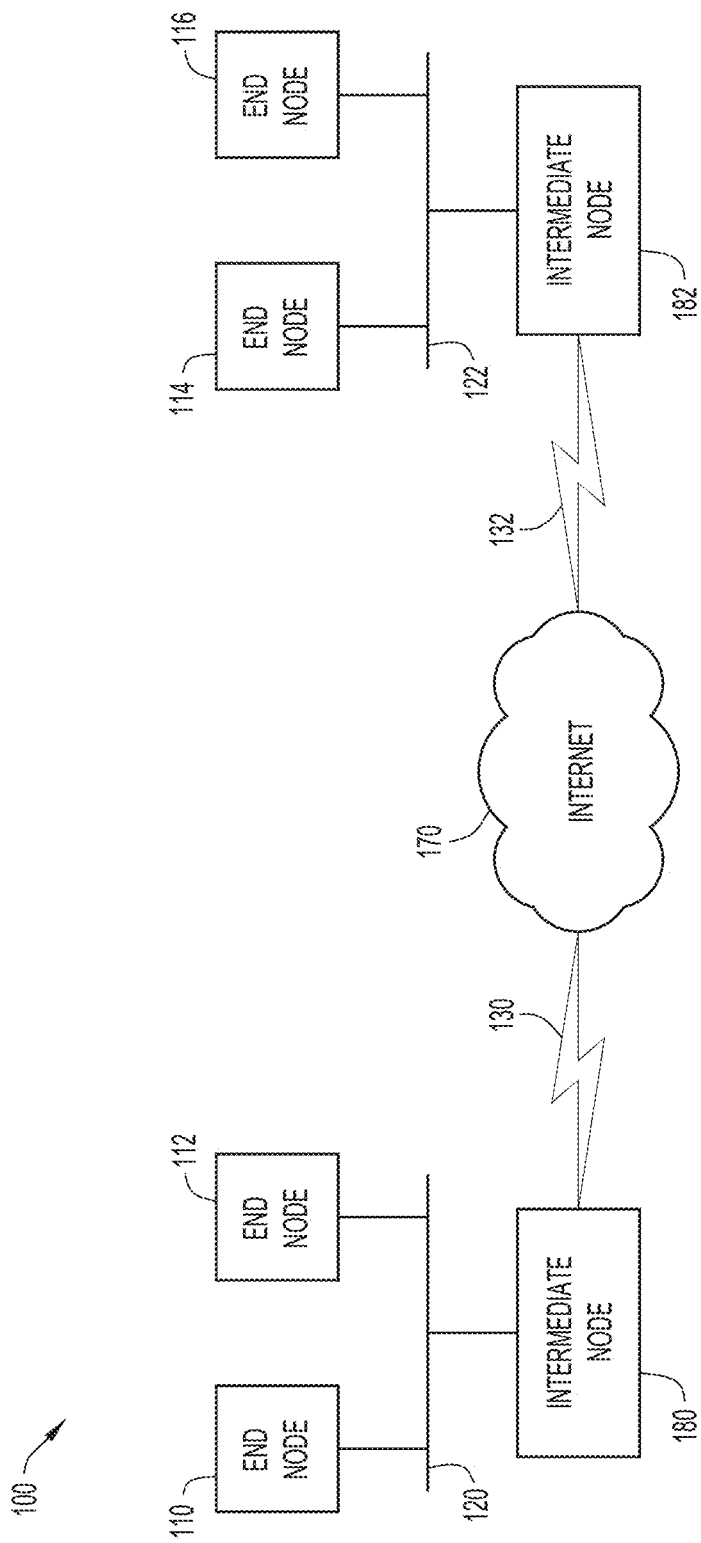
FIG. 1 is a schematic block diagram of a communication or computer network.

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

Overview

Techniques for use in optimizing IP multicast delivery with use of local source nodes and the propagation of advertisements therefor are described herein.

In one illustrative example, a network node connected in a network fabric may identify that it is established as part of a multicast distribution tree for forwarding multicast traffic from a source node to one or more host receiver devices of a multicast group. In response, the network node may propagate to one or more adjacent nodes in the network fabric a message for advertising the network node as a candidate local source node at which to join the multicast group. The message for advertising may include data such as a reachability metric. The propagation of the message may be part of a flooding of such messages in the network fabric from other network nodes. The network node serving as the candidate local source node may thereafter join a host receiver device in the multicast group at the network node so that the device may receive the multicast traffic from the source node via the network node (i.e. instead of a separate multicast distribution tree being built to the source node).

More detailed and alternative techniques and implementations are provided herein as described below.

Example Embodiments

Data communication in a computer network may involve the exchange of data between two or more entities interconnected by communication links, segments and subnetworks. These entities are typically software processes executing on hardware computer platforms, such as end nodes and intermediate nodes. Communication software executing on the end nodes correlate and manage data communication with other end nodes. For general network (e.g. Internet) communications, the nodes typically communicate by exchanging discrete frames or packets of data according to pre-defined protocols, such as the Transmission Control Protocol/Internet Protocol (TCP/IP).

An intermediate node, such as a router, may interconnect the subnetworks to extend the effective "size" of the computer network. The router executes routing protocols used to direct the transmission of data traffic between the end nodes, such as host devices. Typically, the router directs network traffic based on destination address prefixes contained in the packets (i.e. the portions of destination addresses used by the routing protocol to render routing or "next hop" forwarding decisions). Examples of such destination addresses include IP version 4 (IPv4) and IP version 6 (IPv6) addresses. A prefix implies a combination of an IP address and a mask that cooperate to describe an area or range of the network that a router can reach, whereas a route implies a combination of a set of path attributes and a prefix.

Unicast data transfer (i.e. unicast forwarding) involves forwarding a data packet from a single sending process of an end node ("host source device") to a single receiving process of an end node ("host receiver device") on the computer network. Often the destination of the data packet issued by a host source device may be more than one, but less than all of the host receiver devices on the network. This type of multicast data transfer (i.e. multicast forwarding) is typically employed to segregate communication between groups of host receiver devices on the network. IP multicasting, in particular, may be used to disseminate data to a large group of host receiver devices on the network.

IP multicast is a bandwidth-conserving technique that reduces traffic by simultaneously delivering a single stream of information to potentially thousands of corporate recipients and homes. Applications that take advantage of multicast include video conferencing, corporate communications, distance learning, and distribution of software, stock quotes, and news. IP multicast delivers application source traffic to multiple host receiver devices without burdening the source or the host receiver devices while using a minimum of network bandwidth. Multicast packets are replicated in the network at the point where paths diverge by routers enabled with Protocol Independent Multicast (PIM) and other supporting multicast protocols, resulting in the most efficient delivery of data to multiple host receiver devices.

Many alternatives to IP multicast require the source to send more than one copy of the data. Some, such as application-level multicast, require the source to send an individual copy to each host receiver device. Even low-bandwidth applications can benefit from using IP multicast when there are thousands of host receiver devices. High-bandwidth applications, such as Motion Picture Experts Group (MPEG) video, may require a large portion of the available network bandwidth for a single stream. In these applications, IP multicast is the (e.g. only) satisfactory way to send to more than one host receiver devices simultaneously.

Host receiver devices of a designated multicast group may be interested in receiving the video data stream from the source. The host receiver devices indicate their interest by sending an Internet Group Management Protocol (IGMP) host report to the routers in the network. The routers are then responsible for delivering the data from the source to the host receiver devices. The routers use PIM to dynamically create a multicast distribution tree. The video data stream will then be delivered only to the network segments that are in the path between the source and the host receiver devices. This process is further explained in the following sections.

Multicast is based on the concept of a group. A multicast group may be an arbitrary group of host receiver devices that expresses an interest in receiving a particular data stream. This group has no physical or geographical boundaries; the hosts may be located anywhere on the Internet or any private internetwork. Host receiver devices that are interested in receiving data flowing to a particular group typically join the group using IGMP. In order to receive the data stream, host receiver devices may join the group to become a group member.

More specifically, IP multicast addresses may specify a set of IP hosts that have joined a group to express an interest in receiving multicast traffic designated for that particular group. IPv4 multicast address conventions may be described as follows. For IP Class D Addresses, the Internet Assigned Numbers Authority (IANA) controls the assignment of IP multicast addresses. IANA has assigned the IPv4 Class D address space to be used for IP multicast. Therefore, all IP multicast group addresses fall in the range from 224.0.0.0 through 239.255.255.255. The Class D address range is used (only) for the group address or destination address of IP multicast traffic. In conventional operation, the source address for multicast datagrams may be the unicast source address.

To affect IP multicasting, the source generally specifies a destination IP address that is a multicast group address for the message and, as such, can only represent host receiver devices of packets. The IPv4 (or IPv6) address range is subdivided into different prefixes, one of which is designated for use by IP multicast. Host receiver devices typically notify their communication software of their desire to receive messages destined for the multicast group address; this is called "joining a multicast group". These receiving members then "listen" on the multicast address and, when a multicast message is received at a host receiver device, it delivers a copy of the message to each process that belongs to the group.

IP multicasting may rely on a group management protocol to establish and maintain local multicast group membership, as well as multicast routing protocols to route packets efficiently. The IGMP manages packet communication between hosts and their local multicast router, letting them join or leave groups. That is, IGMP is used to send a group membership message from a host to its directly connected ("last-hop") router, indicating that the host wants to join a group (address) as a host receiver device. Note that IGMP is an IPv4 group membership protocol; the conventional Multicast Listener Discovery (MLD) protocol is substantially similar to, and performs the same functions as, IGMP, but for IPv6. When group membership is established, multicast packets (identified by a multicast group address in the destination address field of an IP header) are forwarded between routers using multicast routing protocols.

Multicast routing protocols construct distribution trees through the network and direct multicast forwarding. The multicast distribution trees define the path that multicast traffic will take through the network to group members. These paths are based on source or shared multicast distribution trees. A multicast distribution tree is shared when any host source device originating data traffic destined to a group address of a multicast group uses the same distribution tree to forward data to the host receiver devices. In contrast, a source distribution tree is a separate, shortest path tree (SPT) built for each source originating traffic to the multicast group.

A rendezvous point is a specific router that is designated as the root of a shared multicast distribution tree. An announcement protocol is used to select and announce rendezvous points to all routers in the network. However, an alternative to using an announcement protocol to automatically advertise rendezvous points to all routers in the network is to manually configure the identity of the rendezvous points on all of the routers. Examples of such an announcement protocol include the Auto-Rendezvous multicast protocol available from Cisco Systems Inc., and the Bootstrap Router (BSR) described in *Bootstrap Router (BSR) Mechanism for PIM Sparse Mode*, RFC 5059, N. Bhaskar et al. January 2008. Examples of multicast routing protocols that use a rendezvous point include Protocol Independent Multicast—Sparse Mode (PIM-SM) and Bidirectional PIM (BIDIR-PIM) protocols. Other multicast protocols that do not require a rendezvous point include PIM dense mode (PIM-DM) and PIM source specific multicast (PIM-SSM) protocols.

IP multicast may be deployed on a computer network using a specific rendezvous point to build a shared multicast distribution tree for a multicast group falling within a destination address prefix or to build a separate SPT for each source originating traffic to the multicast group. A router may join a multicast group (distribution tree) towards the rendezvous point or source. The interface on the router leading towards the rendezvous point or source is an ingress interface. Depending upon the multicast routing protocol, there is usually only one ingress interface on the router receiving multicast packets for a particular route. One or more interfaces on the router leading towards the host receiver devices are egress interfaces. The host receiver devices are leaves or nodes on the distribution tree. Packets are sent from a source to the root (rendezvous point or source itself) of the distribution tree, where they are forwarded towards the branches and out to the nodes that represent the host receiver devices. On each node, packets are received on the ingress interface towards the root of the tree and packets are forwarded out egress interfaces towards the host receiver devices or nodes.

Specifically, a host receiver device may use IGMP to communicate a request to join a multicast group address to a last-hop router. The router communicates that request to its neighboring routers (neighbors) on the link towards the rendezvous point (for a shared tree) or source (for a SPT) using a multicast routing protocol, such as PIM. Auto-Rendezvous or BSR may be used to distribute group range-to-rendezvous point address mapping configuration to all PIM-enabled routers that participate in the network topology. Collectively, the routers may construct a multicast distribution tree rooted at a rendezvous point or source for that group address and having a branch (link) that "pulls" packets towards the last-hop router. Note that only a single multicast router (forwarder) should forward packets for a route over a specific link of the tree.

The infrastructure of a router typically comprises functional components organized as a control plane and a data plane. The control plane includes the functional components needed to manage the traffic forwarding features of the router. These components include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented on the single processor. However, for some high-performance routers, these planes are implemented within separate devices of the intermediate node. For example, the control plane may be implemented in a supervisor processor, whereas the data plane may be implemented within a hardware-assist device, such as a co-processor or a forwarding processor. In other words, the data plane is typically implemented in hardware that is separate from the hardware that implements the control plane.

To better illustrate in relation to FIG. 1, a schematic block diagram of a communication or computer network 100 is shown. The computer network 100 comprises a collection of communication links, segments and subnetworks connected to a plurality of nodes, such as end nodes 110 and 112 connected to an intermediate node 180, and end nodes 114 and 116 connected to an intermediate node 182. The links, segments and subnetworks may comprise local area networks (LANs) 120 and 122, wide area networks (WANs) such as the Internet 170, and WAN links 130 and 132 interconnected by intermediate nodes 180 and 182, respectively, which may be network switches or routers, to form a network of computer nodes.

Figure 2:
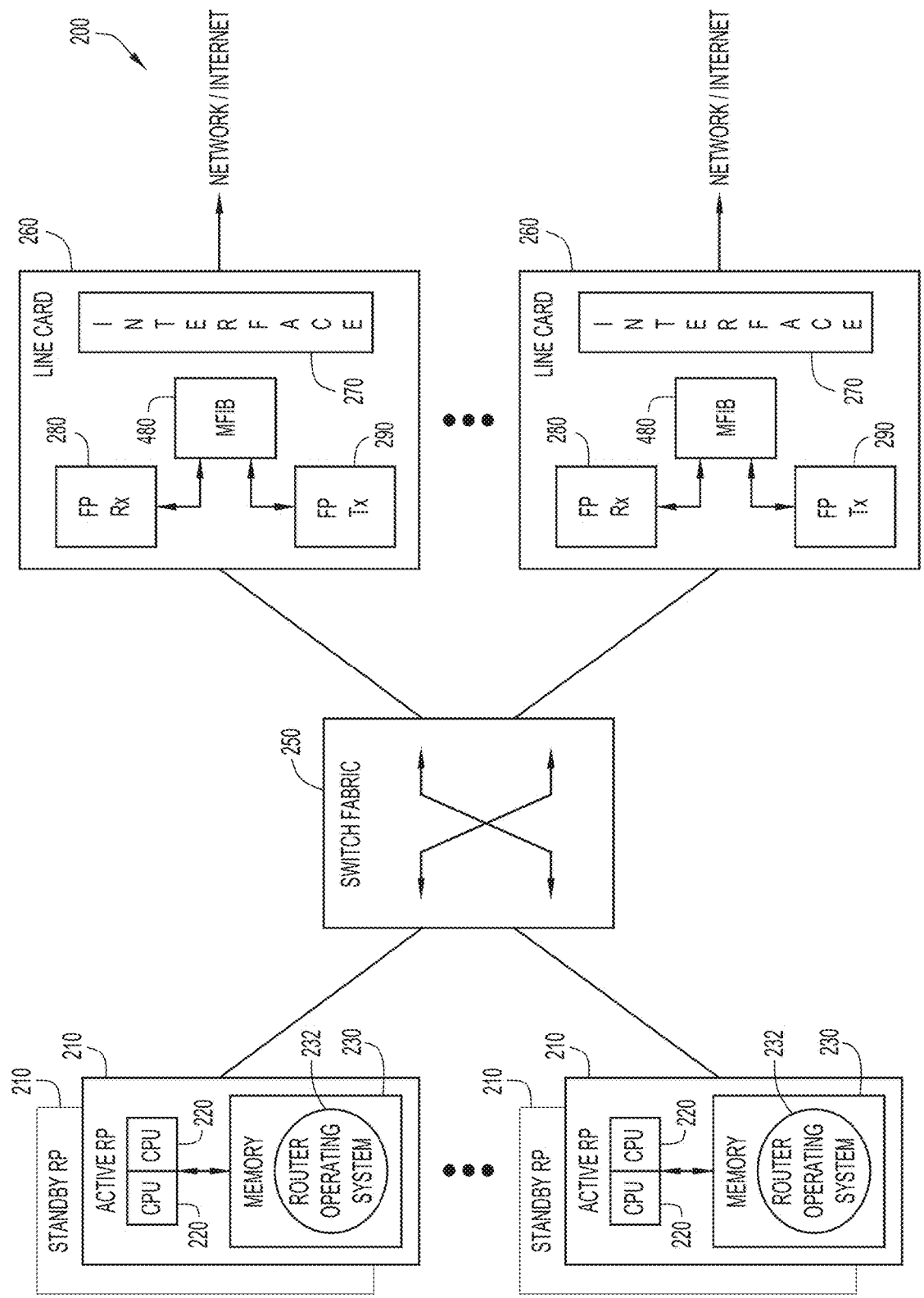
FIG. 2 is a schematic block diagram of a router or router node, such as multicast router or router node, of the network of FIG. 1.

FIG. 2 is a schematic block diagram of a router 200, such as multicast router. The router 200 comprises a plurality of (e.g. loosely-coupled) route processors 210 connected to a plurality of (e.g. ingress and egress) line cards 260 via an interconnect 250 such as, e.g. a crossbar interconnection or high-speed bus. Those skilled in the art will recognize that other router platforms such as, e.g. a uniprocessor system or a plurality of independent nodes interconnected via a communications fabric as a multi-node cluster, could be used. In this context, the term "node" denotes a computer or processor complex comprising processors and an independent memory shared by the processors.

The route processors 210 are illustratively route processors or "RPs" configured as active and standby RP pairs, with each processor having a dedicated memory 230. The memory 230 may comprise storage locations addressable by the processor for storing software programs and data structures. The route processor 210 may comprise processing elements or logic for executing the software programs and manipulating the data structures. A router operating system 232, portions of which are typically resident in memory 230 and executed by the processor, functionally organizes the router by, inter alia, invoking network operations in support of software processes executing on the processor. It will be apparent to those skilled in the art that other processor and memory means, including various computer readable media, may be used for storing and executing program instructions pertaining to the inventive technique described herein.

In some instances, the line cards may perform forwarding of the data traffic, while the route processors handle routing and control of the data traffic forwarding. Each route processor comprises two central processing units (CPUs 220), e.g. Power-PC 7460 chips, configured as a symmetric multiprocessing (SMP) pair. The CPU SMP pair is adapted to run a single copy of the router operating system 232 and access its space in memory 230. Each line card 260 comprises an interface 270 having a plurality of ports coupled to a receive forwarding processor (FP Rx 280) and a transmit forwarding processor (FP Tx 290). The FP Rx 280 renders a forwarding decision for each packet received at the router on an ingress interface of an ingress line card in order to determine where to forward the packet. To that end, the FP Rx makes use of a multicast forwarding information base (MFIB) 480, described further herein. In the event that the packet is to be forwarded to one of the router's route processors, the FP Rx makes use of an internal FIB, IFIB, to determine to which route processor the packet should be forwarded. Likewise, the FP Tx 290 performs lookup operations (using MFIB 480) on a packet transmitted from the router via one or more egress interfaces of an egress line card.

Figure 3:
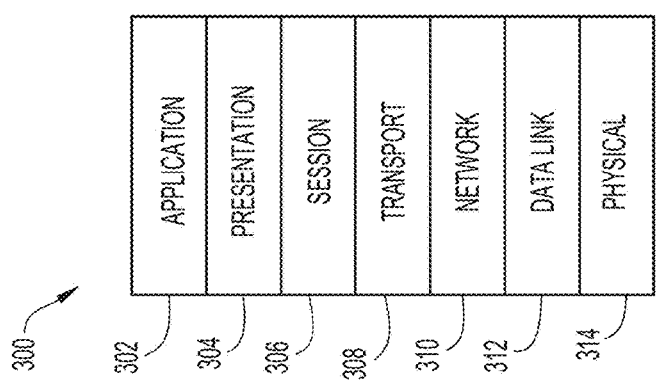
FIG. 3 is a schematic block diagram of a conventional network protocol stack, such as an Internet communications protocol stack.

A key function of the router 200 is determining one or more interfaces to which a packet is forwarded in the router. In order to accomplish such routing, the routers cooperate to determine the best paths through the computer network 100 (FIG. 1). Such a routing function may generally be performed by one or more layers of a conventional protocol stack within each router. To better illustrate, FIG. 3 is a block diagram of a conventional network protocol stack, such as an Internet communications protocol stack 300. In particular, protocol stack 300 of FIG. 3 is that defined by the International Standards Organization (ISO) 7-layer Open Systems Interconnection (OSI) model. Protocol stack 300 includes a plurality of layers which include, in descending order, an application layer 302, a presentation layer 304, a session layer 306, a transport layer 308, a network layer 310, a data link 312, and physical layer 314. The lower layers are generally standardized and implemented in hardware and firmware, whereas the higher layers are typically implemented in the form of software. A router is generally configured to process at the physical 314, data link 312, and network layers 310, whereas a switch is generally configured to process at the physical 314 and data link layers 312.

As is well-known, the primary layer protocol of the Internet architecture is the IP. IP is primarily a connectionless protocol that provides for routing, fragmentation and assembly of exchanged packets—generally referred to as "datagrams" in an Internet environment. IP relies on transport protocols for end-to-end reliability and other service characteristics. An example of such a transport protocol is the TCP protocol, providing connection-oriented, end-to-end reliability services to the upper layer protocols of the Internet architecture. For IP multicasting, however, other suitable protocols may be utilized, such as a real-time transport protocol (RTP)/IP.

Network layer 310 is concerned with how packets are routed or forwarded through the network. A multicast routing protocol may be used to perform multicast routing through the computer network. Examples of multicast protocols may include the PIM-SM and PIM source specific multicast (PIM-SSM) routing protocols, along with IGMP. These protocols are well-known and described in detail in *Protocol Independent Multicast—Sparse Mode (PIM-SM): Protocol Specification (Revised)*, Request for Comments (RFC) 4601, B. Fenner et al., August 2006; and *Internet Group Management Protocol, Version* 3, RFC 3376, Cain et al., October 2002. Each of the above documents are hereby incorporated by reference as though fully set forth herein.

PIM relies on an underlying topology-gathering protocol to populate a unicast routing table 425 (FIG. 4) of a routing information base (RIB) 420 with routes. The RIB 420 may store generalized route state for those unicast routes that are needed by unicast forwarding and PIM 430. For unicast routes of interest, PIM caches information in its PIM topology table 435. The cached information may include next-hop addresses, next-hop interfaces, connected flags (indicating whether the addresses are directly connected) and metrics. The routes in the RIB table may be provided directly from a unicast routing table or by separate routing protocols, such as the Border Gateway Protocol (BGP) version 4 (BGP4) and Multi-protocol extensions to BGP4 (MBGP). BGP4 is an interdomain routing protocol used to perform interdomain routing (for the internetwork layer) through the computer network. The routers 200 (hereinafter "neighbors") may exchange routing and network layer reachability information (NLRI) among autonomous systems over a reliable trans-port layer connection, such as TCP. An adjacency is a relationship formed between selected neighbors for the purpose of exchanging routing messages and abstracting the network topology.

BGP4 is generally capable of only carrying routing information for IPv4; accordingly, MBGP extends BGP4 to allow carrying of routing information for multiple network layer protocols, including IPv6 addresses. MBGP extends BGP4 to associate these network layer protocols with next hop information and NLRI, including NLRI for multicast forwarding. Address Family Identifiers (AFIs) and Subsequent Address Family Identifiers (SAFIs) are used to identify the network layer protocols and the type of NLRI. MBGP and AFI/SAFI Address Family are well known and described in RFC 2858, by T. Bates et al. (2000) and RFC 1700 by J. Reynolds et al (1994), which are hereby incorporated by reference.

Figure 4:
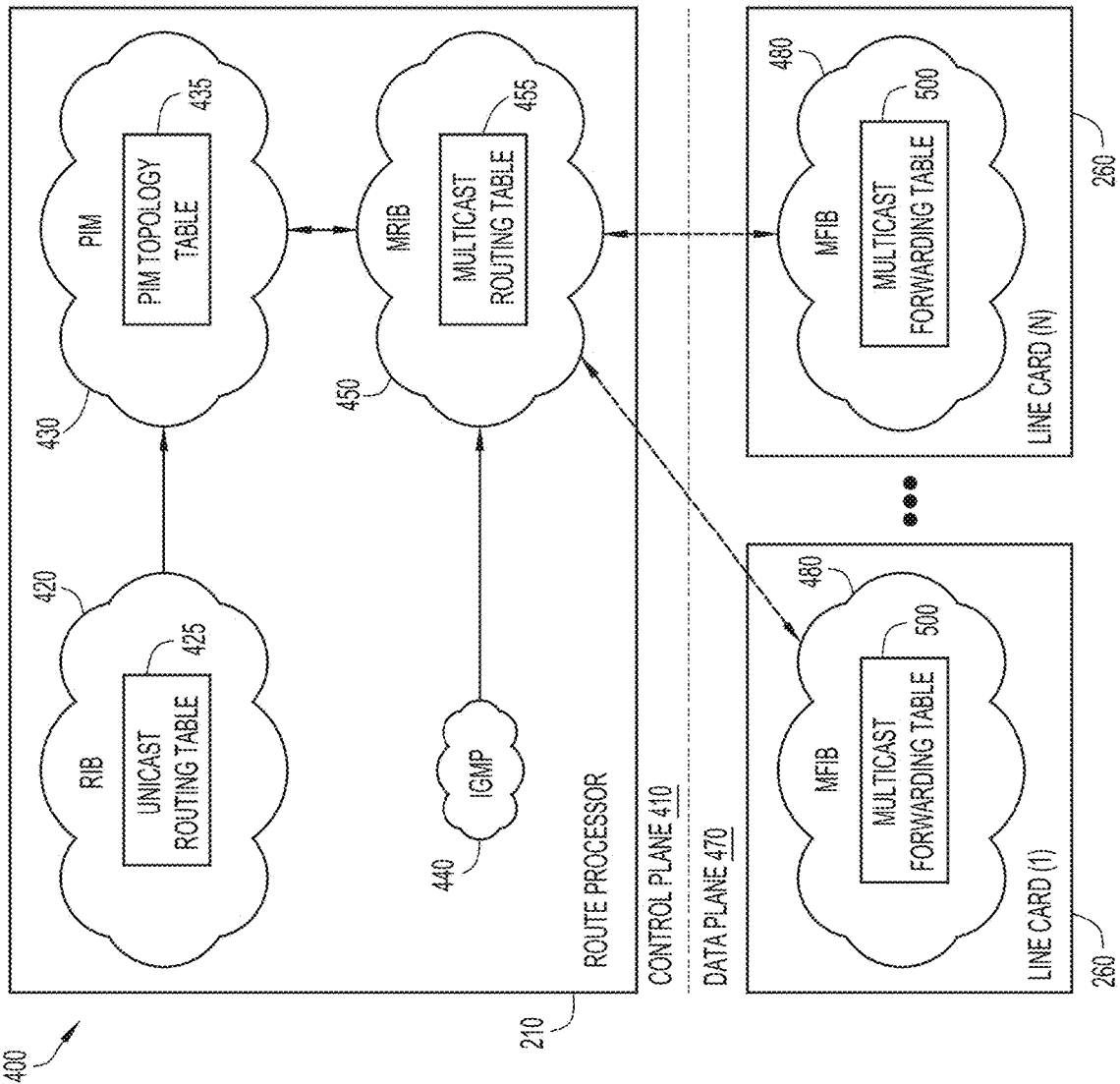
FIG. 4 is a schematic block diagram illustrating an example functional infrastructure of the router of FIG. 2.

FIG. 4 is a schematic block diagram illustrating the functional infrastructure 400 of the router 200. The functional infrastructure 400 is preferably separated into a control plane 410 and a data plane 470, wherein separation is specified in terms of software components overlayed onto hardware elements, such as the route processors 210 and line cards 260. The data plane components/elements are configured to retrieve data packets from the network and provide those packets to forwarding logic of the router (and vice versa). In contrast, the control plane components/elements are used to manage/control traffic forwarding operations of the router. The infrastructure 400 allows the router to continue performing traffic forwarding operations throughout the data plane 470 in the presence of a failure and/or software restart within the control plane 410.

In the illustrative embodiment, the router operating system 232 implements multicast components as separate software process modules that are individually restartable and distributed over active route processors 210 and line cards 260 which, in turn, are individually hot-swappable and may have redundant (standby) backups. To that end, the data plane multicast components include MFIBs 1-N 480 executing on the line cards, whereas the control plane multicast components include the RIB 420, PIM 430, IGMP 440 and a multicast RIB (MRIB) 450 executing on the route processors 210. Operationally, the control plane of the router builds the MRIB 450 (and, more specifically, its multicast routing table 455) after exchanging routing information with the neighbors. For example, PIM provides MRIB 450 with a chosen reverse path forwarding (RPF) address and interface for each route, which is used by the data plane to accept packets for forwarding through the router. The primary role of the MRIB 450 is to facilitate communication between the various multicast components, i.e. coordinate distribution of state between the protocol applications (e.g. PIM, IGMP, etc.) and between these protocols and MFIB 480. As a result, MRIB 450 provides the next hop router information and a multicast-capable path to each multicast destination. The MFIB 480 is derived from the MRIB and is embodied as one or more multicast forwarding tables 500 that are populated on the line cards 260 and whose contents describe how to forward data packets through the router.

Figure 5:
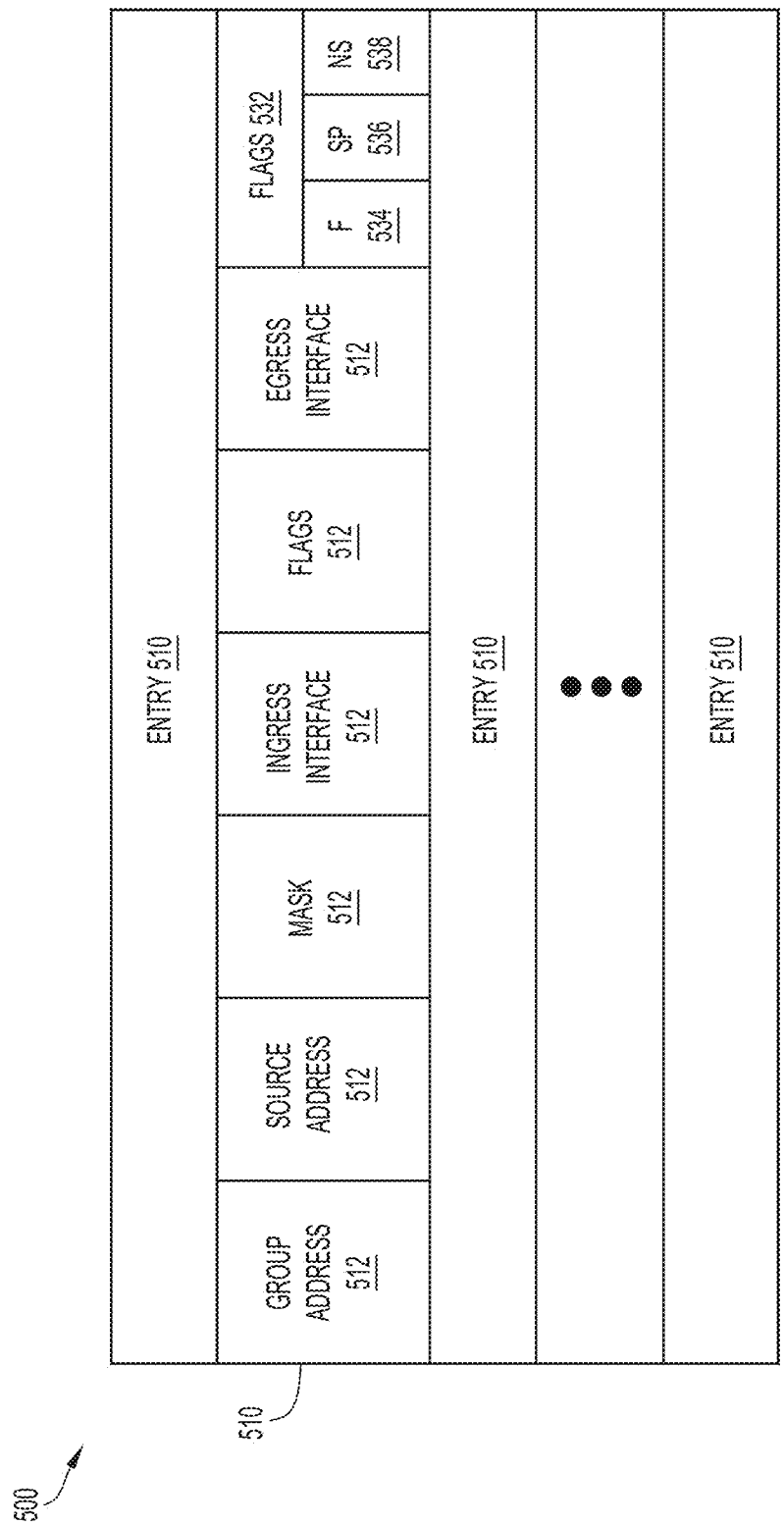
FIG. 5 is a schematic block diagram of an illustrative embodiment of a multicast forwarding table that may be used herein.

FIG. 5 is a schematic block diagram of an illustrative embodiment of a MFIB multicast forwarding table 500 that may be used herein. The MFIB forwarding table 500 comprises a plurality of entries 510, each of which is populated by a multicast routing protocol, such as PIM, with routing information (i.e. a route). Each MFIB forwarding table entry 510 includes a group address field 512 containing a multicast group network (IP) address, a source address field 514 containing a source IP address and a mask field 516 containing a mask value indicating the number of most significant bits of the group (and source) address needed to form a prefix.

Each MFIB forwarding table entry 510 also includes an ingress interface field 520 that specifies an ingress interface on which an incoming multicast packet should be accepted, as well as an egress interface(s) field 530 containing a list of egress (forwarding) interfaces over which the incoming packet should be forwarded. One or more control flags 522, 532 may be associated with each interface of the entry, wherein the control flags specify certain actions/behavior to be taken by the router in response to the reception of the incoming packet. For example, a control flag F 534 indicates whether an accepted multicast packet matching the entry is to be forwarded over an associated interface, a control flag "SP" 536 is used to signal the route processor of the arrival of a multicast data packet and a control flag "NS" 538 is used to control the behavior of a forwarding engine (i.e. MFIB) in asserting the control flag SP 536.

In response to receiving the incoming packet from a neighbor, the MFIB 480 performs a lookup into its forwarding table 500 to find a route of an entry 510 that matches a multicast destination address of the packet. The matching route instructs the router as to which egress interfaces the packet should be forwarded. For certain multicast routing protocols (such as PIM-SM and PIM-SSM), the multicast packet is typically accepted on a single ingress interface, i.e. the RPF interface that represents the shortest path to the source, and is forwarded out a set of egress interfaces to other destinations (routers) that have expressed interest in receiving the data traffic. The ingress interface 520 for the matching entry may have one or more asserted control flags 522 instructing the data plane 470 to signal the control plane 410 when the multicast packet is received at the router. The arrival of the multicast packet on that ingress interface is thus a data-driven event.

Data-driven events cause changes in state and control messages exchanged among a multicast routing protocol, such as PIM, executing on the router and its neighbors. In the illustrative multicast NSF router architecture, the data plane 470 notifies the control plane 410 of the data-driven event (via a control signal) and the control plane interprets that event in order to re-converge on the correct forwarding state. The MFIB 480 is the multicast component in the data plane that notifies MRIB 450 in the control plane of the data-driven event. MRIB then passes that notification to PIM 430, which uses the reception of multicast data packets that are to be forwarded by the router to infer portions of the current network topology used to forward the packets. The control signal received by PIM indicates that a data-driven event occurred for a particular source and group address 512, 514 of a multicast data packet that was received at a particular interface of the router. Reception of a multicast packet can thus be interpreted as an event signal to modify the contents of the MFIB forwarding table 500.

In the illustrative embodiment, if a packet is received on an egress interface that is used for forwarding out of the router, the data plane (e.g. MFIB) communicates the data-driven event to the control plane (e.g. PIM). Protocol negotiation between the router and other PIM-enabled routers on the link, including the neighbor that forwarded the packet, is then used to determine which router should be forwarding traffic over the interface and link. Such protocol negotiation occurs in the control plane, requiring "live" PIM components 430 on all the routers. Here, PIM employs conventional assert messages to determine which router should be forwarding the packet over the link and which router is in error. The PIM assert protocol negotiation procedure is well-known and described in the previously incorporated document RFC 4601.

Multicast routers may be configured to create multicast distribution trees that control the path along which IP multicast traffic takes through the network in order to deliver traffic to all host receiver devices. Two example types of multicast distribution trees are source trees and shared trees.

The simplest form of a multicast distribution tree is the source tree, having its root at the source and branches forming a spanning tree through the network to the host receiver devices. Because this tree uses the shortest path through the network, it is also referred to as an SPT. Here, a special notation of "(S, G)" may be used. (S, G) enumerates an SPT where S is the IP address of the source and G is the multicast group address. The (S, G) notation implies that a separate SPT exists for each individual source sending to each group. Unlike source trees that have their root at the source, shared trees use a single common root placed at some chosen point in the network. This shared root may be referred to as the rendezvous point. When using a shared tree, sources send their traffic to the root and then the traffic is forwarded down the shared tree to reach all host receiver devices. Since all sources in the multicast group use a common shared tree, a wildcard notation written as (*, G) may represent the tree. In this case, *means all sources, and G represents the multicast group. Typically, both SPTs and Shared Trees are loop-free. Messages are replicated only where the tree branches.

Members of multicast groups can join or leave at any time; therefore the distribution trees may be dynamically updated. When all the active host receiver devices on a particular branch stop requesting the traffic for a particular multicast group, the routers may prune that branch from the distribution tree and stop forwarding traffic down that branch. If one host receiver device on that branch becomes active and requests the multicast traffic, the router will dynamically modify the distribution tree and start forwarding traffic again.

Shortest path trees allow for the creation of an optimal path between the source and the host receiver devices. In at least many or most instances, this provides for a minimum amount of network latency in the forwarding multicast traffic. Here, the routers in the tree have to maintain path information for each source in a multicast routing table. Considering the potentially large number of sources and groups that may be established, attention should be given with respect to the limited memory resources in the routers. On the other hand, shared trees allow for a minimum or reduced amount of state to be maintained in each router. This lowers the overall memory requirements in a network that allows for only shared trees. In shared trees, the paths between the source and the host receiver device may not always be optimal paths. This may introduce some latency in packet delivery.

Figure 6:
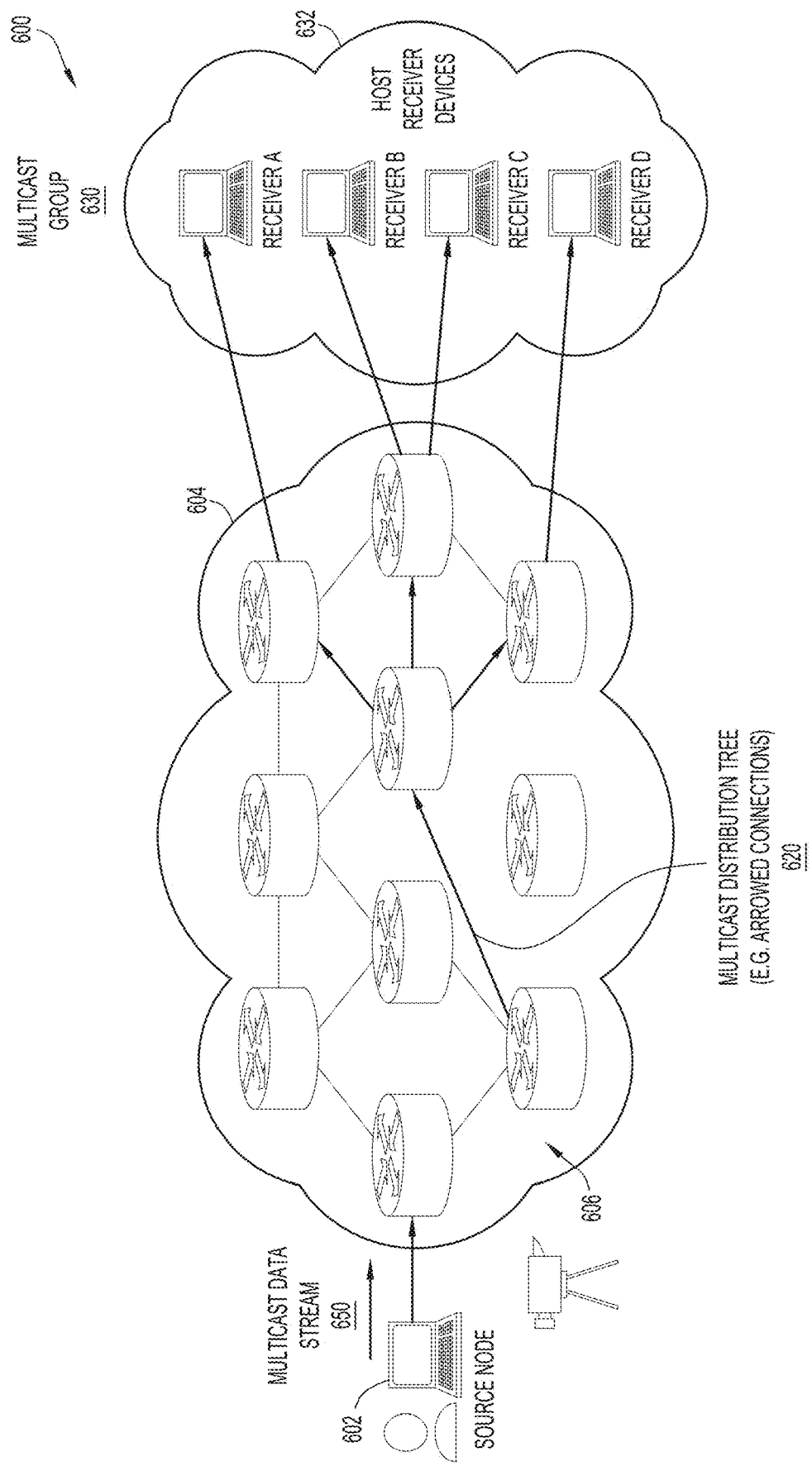
FIG. 6 is an illustrative representation of a more basic system within which at least some implementations of the present disclosure may be practiced.

FIG. 6 is an illustrative representation of a more basic communication system 600 for describing basic IP multicasting. Communication system 600 may include one or more communication networks 604 having a plurality of router nodes 606. A source node 602 which connected in network 604 may be configured to generate and multicast a data stream 650 to a multicast group 630 with use of IP multicast messages. The multicast group 630 may include a plurality of group members corresponding to a plurality of host receiver devices 632 (e.g. host receiver devices A, B, C, and D) connected to some of the (e.g. edge) router nodes 606. The IP multicast messages may use a multicast group address to address communications to the multicast group 630, downstream along a multicast distribution tree 620 formed by some (selected ones) of the router nodes 606.

IP multicast has been defined and designed in such a way that, when any host receiver device starts a sending a membership request (e.g. using IGMP), the nearest router attempts to find the shortest path to reach the multicast source prefix for the source node. Multicast services rely on Interior Gateway Protocol (IGP) reachability to the source node. As IGP is utilized, a multicast distribution tree that may available much nearer to the router than the actual source may be overlooked. This may create a less-than-optimal IP multicast delivery.

Figure 7B:
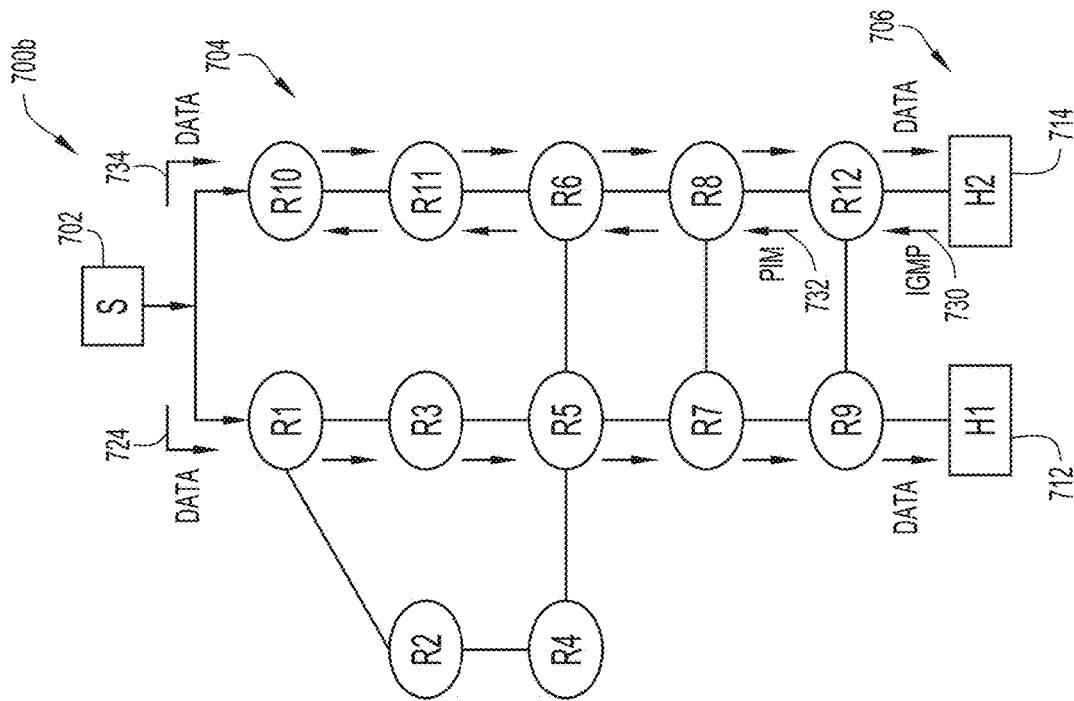
FIGS. 7A and 7B are illustrative representations of a network fabric which includes a plurality of interconnected network nodes (e.g. routers) configured for IP multicast delivery, for use in describing an example scenario that results in a less-than-optimal delivery of IP multicast traffic.
Figure 7A:
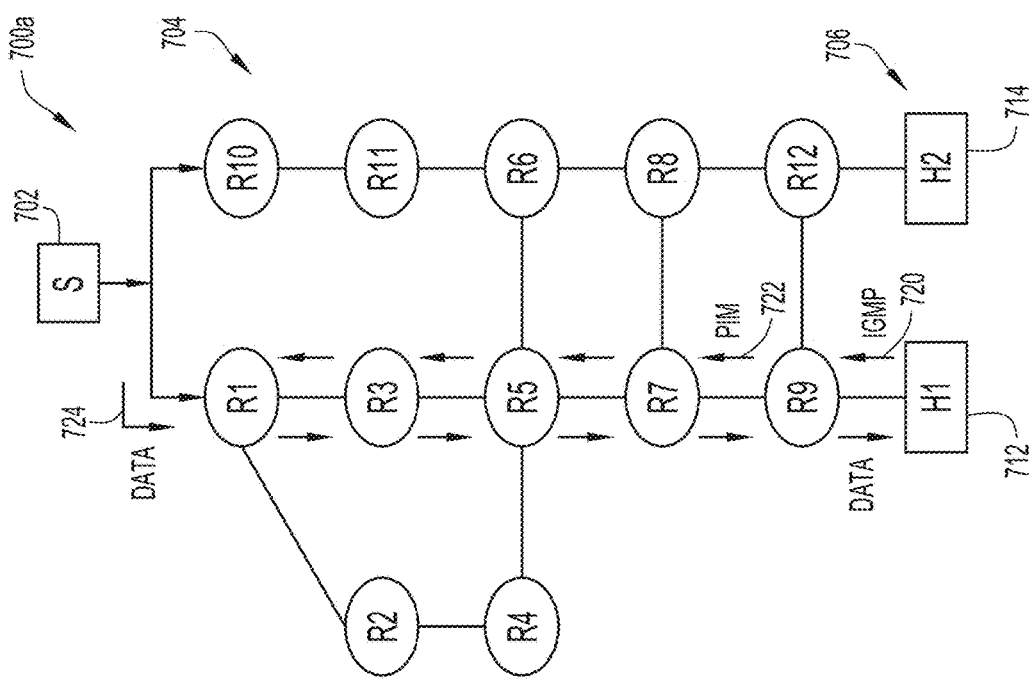

FIGS. 7A and 7B are illustrative representations 700a, 700b of a network fabric which includes a plurality of interconnected network nodes 704 (e.g. routers) in a network fabric configured for IP multicast delivery, for use in describing an example scenario that results in a less-than-optimal delivery of IP multicast traffic. The plurality of network nodes 704 of the network fabric may include routers designated R1 through R12 as shown. A plurality of host receiver devices 706 may include a host receiver device 712 ("H1") and a host receiver device 714 ("H2"). A source node 702 ("S") may be configured to provide a multicast traffic flow for the host receiver devices 706.

In the representation 700a of FIG. 7A, when host receiver device 712 sends a multicast membership request (e.g. IGMP) at 720, the request gets converted by R9 to a PIM join in the PIM domain at 722. The PIM join may travel hop-by-hop towards the source node 702. IGP is relied upon for processing of the PIM join in order to provide the shortest or best path to reach the source prefix. Here, a multicast distribution tree which includes R1, R3, R5, R7, and R9 is established for the delivery of multicast traffic data 724 from source node 702 to host receiver device 712.

Continuing with the representation 700b of FIG. 7B, when host receiver device 714 ("H2") starts sending a multicast membership request (e.g. IGMP) to R12 at 730, R12 performs similar steps as R9 (i.e. converting the request to a PIM join at 732) and attempts to find the shortest or best path to the source prefix using IGP. Here, a separate multicast distribution tree which includes R10, R11, R6, R8, and R12 is established for the delivery of multicast traffic data 734 from source node 702 to host receiver device 714. Once host receiver device 712 has setup the multicast distribution tree to the source node 702 and started to receive multicast traffic data 724, all routers R1, R3, R5, R7, and R9 have the active multicast traffic; however, the presence of such traffic is not appreciated nor utilized. As is apparent, the shortest path to the source node may not always be the most optimal path to the source node.

Figure 8A:
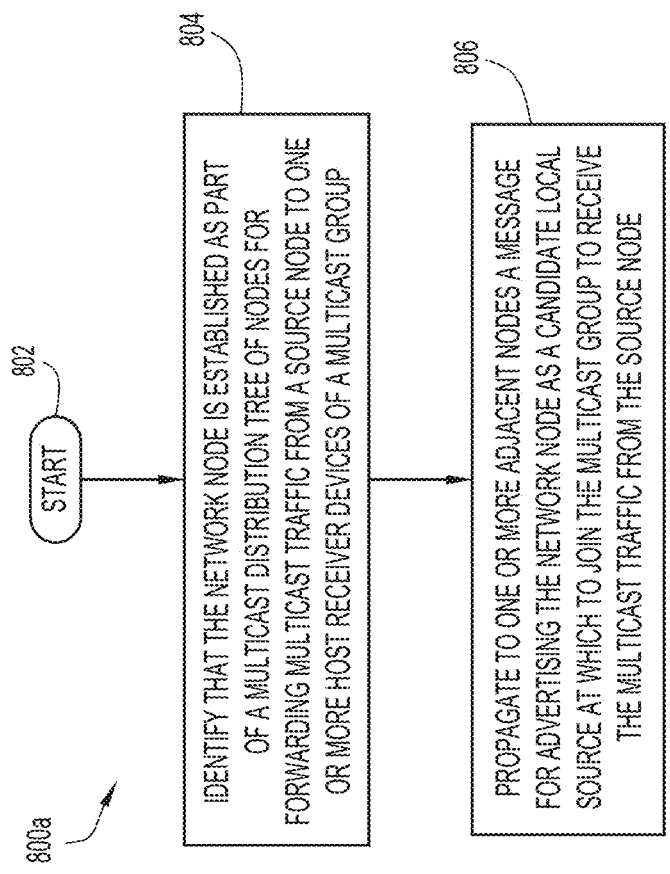
FIG. 8A is a flowchart for describing a method for use in IP multicast delivery with use of local source nodes and the propagation of advertisements therefor according to some implementations of the present disclosure, which may be performed by a network node (e.g. a router) which may serve as a local source node of a multicast distribution tree.

FIG. 8A is a flowchart 800a for describing a method for use in optimizing IP multicast traffic delivery with use of local source nodes according to some implementations of the present disclosure. The method of FIG. 8A may be performed by a network node (e.g. a router) for use in a network fabric which includes the plurality of interconnected network nodes. The network node may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the network node for performing the steps of the method.

Beginning at a start block 802 of FIG. 8A, the network node may identify that it is established as part of a multicast distribution tree of nodes for forwarding multicast traffic from a source node to one or more host receiver devices of a multicast group (step 804 of FIG. 8A). In response, the network node may propagate to one or more adjacent nodes a message for advertising the network node as a candidate local source node at which to join the multicast group to receive the multicast traffic from the source node (step 806 of FIG. 8A).

After the propagating of the message for advertising in step 806 of FIG. 8A, the network node which advertises as a candidate local source node may be elected or selected to be a local source node. Here, the local source node may receive from an adjacent network node a join request for joining a host receiver device to the multicast group. In response, the local source node may join the host receiver device in the multicast group at this node, so that the host receiver device may receive the multicast traffic from the source node via the local source node (i.e. instead of a separate multicast distribution tree being built to the source node).

To facilitate such joining, the join request utilized may be a PIM join message which includes a PIM reverse path forwarding (RPF) vector that specifies an IP address of an edge router to the host receiver device. See e.g. *The Reverse Path Forwarding (RPF) Vector TLV*, RFC 5496, I J. Wijnands et al., March 2009, which is hereby incorporated by reference as though fully set forth herein.

The advertisement message may include data associated with the network node's availability as a candidate local source node for the multicast traffic. More particularly, the data may include a multicast source address associated with the source node, a multicast group address associated with the multicast group, and a loopback address associated with the network node (i.e. the candidate local source node). The data may further include a reachability metric associated with the loopback address and/or a reachability metric associated with the source node. These data may be used by other network nodes in the network fabric to make decisions as to whether or not to use the candidate local source node for the multicast traffic, and/or to properly identify and join host receiver devices in the multicast group to receive the multi cast traffic.

According to some implementations of the present disclosure, the data in the message for advertising may include: a multicast source address; a multicast group address; a routable loopback address; a metric to reach the loopback address; and a metric to reach the actual source.

The propagation of the message in step 804 may be part of a flooding of messages in the network fabric for advertising a plurality of network nodes of the multicast distribution tree as candidate local source nodes for joining the multicast group. For example, the flooding of messages may be compatible with a PIM flooding mechanism or "PFM." See e.g. *PIM Flooding Mechanism (PFM) and Source Discovery (SD)*, RFC 8364, IJ. Wijnands et al., March 2018, which is hereby incorporated by reference as though fully set forth herein. As another example, the flooding of messages may be performed with use of an IGP extension.

In preferred implementations, techniques may be employed to reduce the number of advertisement messages that are flooded in the network fabric with the flooding mechanism. For example, each message may further include a scope value to limit the propagation of the message. In some implementations, the scope value may be indicative of a number of hop counts or a diameter.

An automated election of source advertisers for a given multicast distribution tree (i.e. S, G tree) may be provided. For example, in some implementations using the flooding mechanism, each one of a plurality of network nodes established in the multicast distribution tree may elect itself to be a candidate local source node and propagate a message for advertising if it identifies that a distance between the network node and another network node which is available as a source (e.g. source node or candidate local source node) in the multicast distribution tree is greater than a threshold value. Such an implementation may facilitate sparseness between sources along the multicast distribution tree and reduce (otherwise excessive) advertisement flooding. Here, a unicast IGP distance/cost to the source may be used.

In some implementations using the flooding mechanism, each one of a plurality of network nodes established in the multicast distribution tree may elect itself to be a candidate local source node and propagate a message for advertising if it identifies that a distance between the network node and another network node which serves as an edge node in the network fabric is less than a threshold value. Such an implementation may facilitate the use of those one or more local source nodes that are closest to one or more edge routers and may reduce (otherwise excessive) advertisement flooding.

In some implementations using the flooding mechanism, each one of a plurality of network nodes established in the multicast distribution tree may elect itself to be a candidate local source node and propagate a message for advertising if it identifies that a number of candidate host receivers to receive the multicast traffic is greater than a threshold value. Such an implementation may facilitate the use of one or more local source nodes based on (any) current potential or possible use by host receiver devices and may reduce (otherwise excessive) advertisement flooding.

In some implementations using the flooding mechanism, each one of a plurality of network nodes established in the multicast distribution tree may employ a technique which makes use of a "trickle" operation. Here, a network node may identify whether a number of candidate host receivers to receive multicast traffic is greater than a first threshold value. If the network node identifies that the number of candidate host receivers is greater than the threshold value, the network node may perform a trickle operation which includes delaying for a random time period and then identifying whether a number of received network node advertisements received over the random time period is greater than a second threshold value. The network node may elect itself to be a candidate local source node and propagate a message for advertising if it identifies that the number of received network node advertisements received over the random time period is greater than the second threshold value.

In some implementations using the flooding mechanism, different combinations of the above techniques may be employed together to reduce the number of elected candidate local source nodes and/or the number of advertisement messages that are flooded.

Figure 8C:
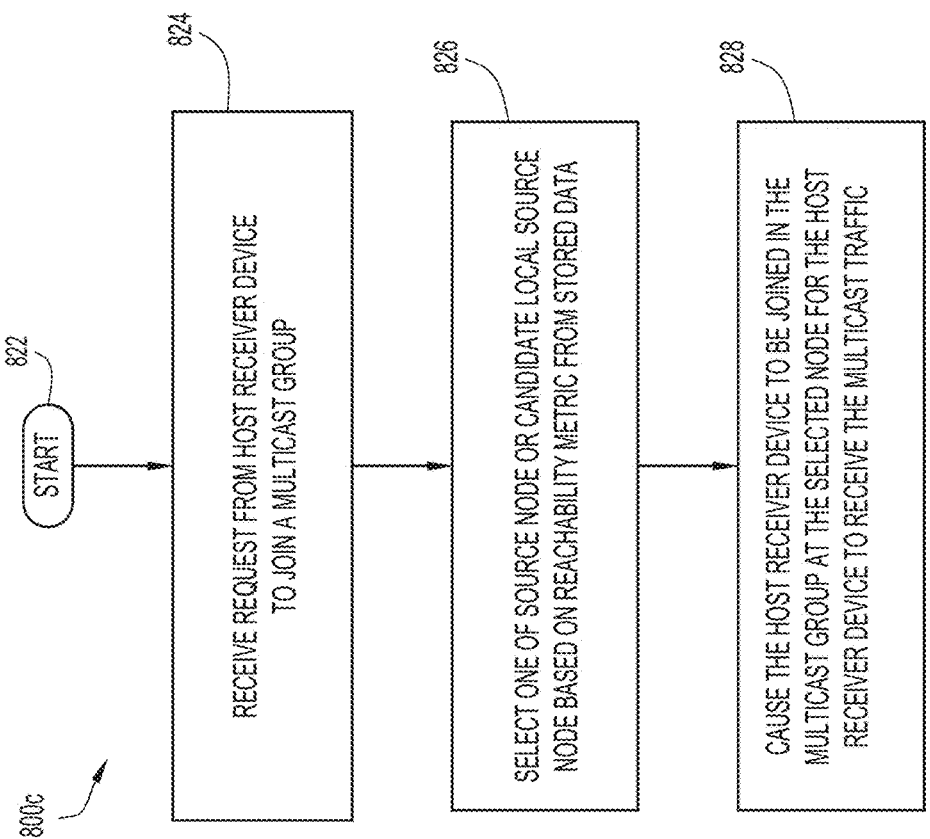
FIGS. 8B and 8C are flowcharts for describing methods for use in IP multicast delivery with use of local source nodes and the propagation of advertisements therefor according to some implementations of the present disclosure, which may be performed by a network node (e.g. an edge router)
Figure 8B:
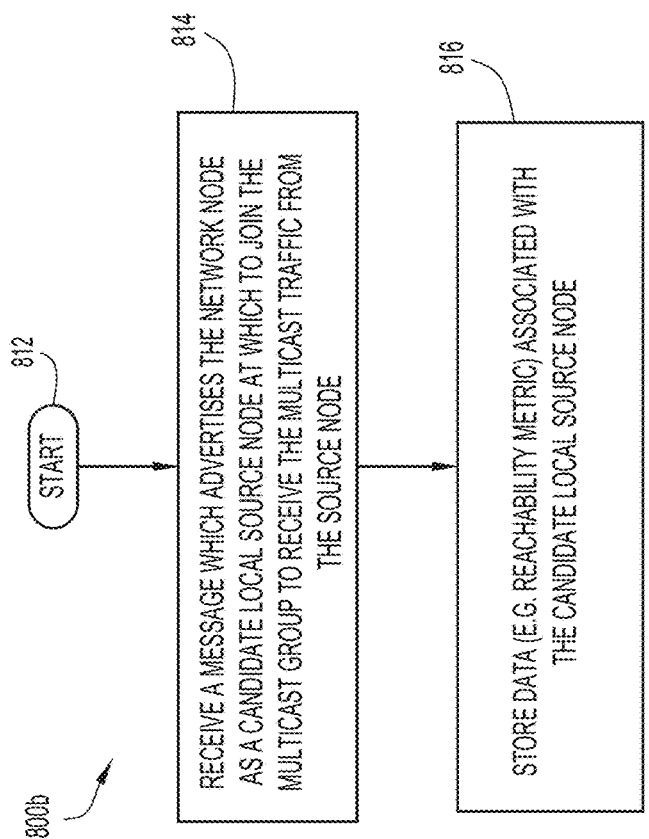

FIG. 8B is a flowchart 800*b* for describing a method for use in optimizing IP multicast traffic delivery with use of local source nodes according to some implementations of the present disclosure. The method of FIG. 8B may be performed by a network node (e.g. an edge router) for use in a network fabric which includes the plurality of interconnected network nodes. The network node may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the network node for performing the steps of the method.

Beginning at a start block 812 of FIG. 8B, a network node (e.g. edge router) may receive a message which advertises a network node of the network fabric as a candidate local source node at which to join a multicast group to receive multicast traffic from a source node (step 814 of FIG. 8B). The network node being advertised is established as part of a multicast distribution tree of nodes for forwarding the multicast traffic from the source node to one or more host receiver devices of the multicast group. Data associated with the message for advertising the network node as the candidate local source node are stored (step 816 of FIG. 8B).

The advertisement message may include data associated with the network node's availability as a candidate local source node for the multicast traffic. More particularly, the data may include a multicast source address associated with the source node, a multicast group address associated with the multicast group, and a loopback address associated with the network node (i.e. the candidate local source node). The data may further include a reachability metric associated with the loopback address and/or a reachability metric associated with the source node. These data may be used by the network node (e.g. edge router) to make decisions as to whether or not to use the candidate local source node for the multicast traffic, and/or to properly identify and join host receiver devices in the multicast group at the network node to receive the multicast traffic.

The receipt of the message in step 814 may be part of the network node's receipt of a plurality of messages of a flooding of messages in the network fabric for the advertisement of a plurality of network nodes of the multicast distribution tree. For example, the flooding of messages may be compatible with PFM-SD according to RFC 8364. As another example, the flooding of messages may be performed with use of the IGP extension. In preferred implementations, techniques may be employed to reduce the number of advertisement messages that are flooded in the network fabric as described above.

Continuing the method at a start block 822 of FIG. 8C, the network node (e.g. the edge router) may receive a host receiver device a join request for joining a host receiver device to the multicast group (step 824 of FIG. 8C). The join request be communicated according to IGMP. In response, the network node may select one of the source node or the candidate local source node based at least on the reachability metric (step 826 of FIG. 8C). For example, the network node may select the candidate local source node over the source node if the reachability metric associated with the candidate local source node is less than the reachability metric associated with the source node. The network node may cause the host receiver device to be joined in the multicast group at the selected node for the host receiver device to receive the multicast traffic (step 828 of FIG. 8C).

FIG. 9A is an illustrative representation 900a of a network fabric which includes a plurality of interconnected network nodes 904 (e.g. routers) configured for IP multicast delivery, for use in describing an example scenario that results in a more optimal multicast traffic delivery (e.g. with use of the techniques described herein, including FIGS. 8A, 8B, and 8C). The plurality of network nodes 904 of the network fabric may include routers designated R1 through R12 as shown. A plurality of host receiver devices 906 may include a host receiver device 912 ("H1") and a host receiver device 914 ("H2"). A source node 902 ("S") may be configured to provide a multicast traffic flow for the host receiver devices 906.

In the representation 900a of FIG. 9A, when host receiver device 912 sends a multicast membership request (e.g. IGMP) at 920, the request gets converted by R9 to a PIM join in the PIM domain at 922. The PIM join may travel hop-by-hop towards the source node 902. IGP is relied upon for processing of the PIM join in order to provide the shortest or best path to reach the source prefix. Here, a multicast distribution tree which includes R1, R3, R5, R7, and R9 is established for the delivery of multicast traffic data 924 from source node 902 to host receiver device 912.

Continuing with a representation 900b of the network fabric in FIG. 9B, it is indicated that some network nodes 950 (e.g. R5, R7, and/or R9) established as part of the multicast distribution tree may be elected and made available as candidate local source nodes. As part of a flooding mechanism of advertisement messages ("Advert.") 930, each network node may propagate to one or more adjacent nodes a message for advertising itself as a candidate local source node at which to join the multicast group to receive the multicast traffic from the source node 902. For example, R9 may propagate a message 932 for advertising ("Advert."), R7 may propagate a message 934 for advertising ("Advert."), and R5 may propagate a message 936 for advertising ("Advert.").

Each advertisement message may include data (e.g. a reachability metric) associated with the network node's availability as a candidate local source node for the multicast traffic. These data may be used by other network nodes (e.g. R12) in the network fabric to make decisions as to whether or not to use the candidate local source node (e.g. R9) for the multicast traffic, and/or to properly identify and join host receiver devices in the multicast group to receive the multicast traffic (see e.g. the description above in relation to FIG. 8A-8C).

Continuing with a representation 900c of the network fabric in FIG. 9C, when host receiver device 914 ("H2") starts sending a multicast membership request (e.g. IGMP) to R12 at 940, R12 may select or determine the most optimal or suitable path for receiving multicast traffic data from the source node 902. The selection or determination may be made by comparing reachability metrics (e.g. comparing the reachability metric of source node 902 and the reachability metric of R9 which serves as a candidate local source node). Here, R12 may select the candidate local source node R9, since the reachability metric associated with R9 is small and much less than the reachability metric associated with the source node 902. R9 may convert the request at 940 to a PIM join in the PIM domain at 942 toward R9. The PIM join may be a PIM join message which includes a PIM RPF vector that specifies an IP address of R12. Here, it is not necessary to rely on IGP for processing of the PIM join to find the shortest path to source node 902. As depicted, multicast traffic data 924 from source node 902 is provided to host receiver device 914 from along the multicast distribution tree via R9 and R12.

FIGS. 10A, 10B, 10C, and 10D are illustrative representations of a network fabric which includes a plurality of interconnected network nodes 1004 (e.g. routers) of a network fabric configured for IP multicast delivery according to some implementations of the present disclosure. These representations are for use in describing an example scenario that results in a more optimal multicast traffic delivery using techniques of the present disclosure (e.g. including the techniques of FIGS. 8A, 8B, and 8C). The plurality of network nodes 1004 of the network fabric may include routers designated R1 through R30 as shown. A plurality of host receiver devices 1006 are designed as H1 through H5 as shown. A source node 1002 ("S") may be configured to provide a multicast traffic flow for the host receiver devices 1006.

Figure 10A:
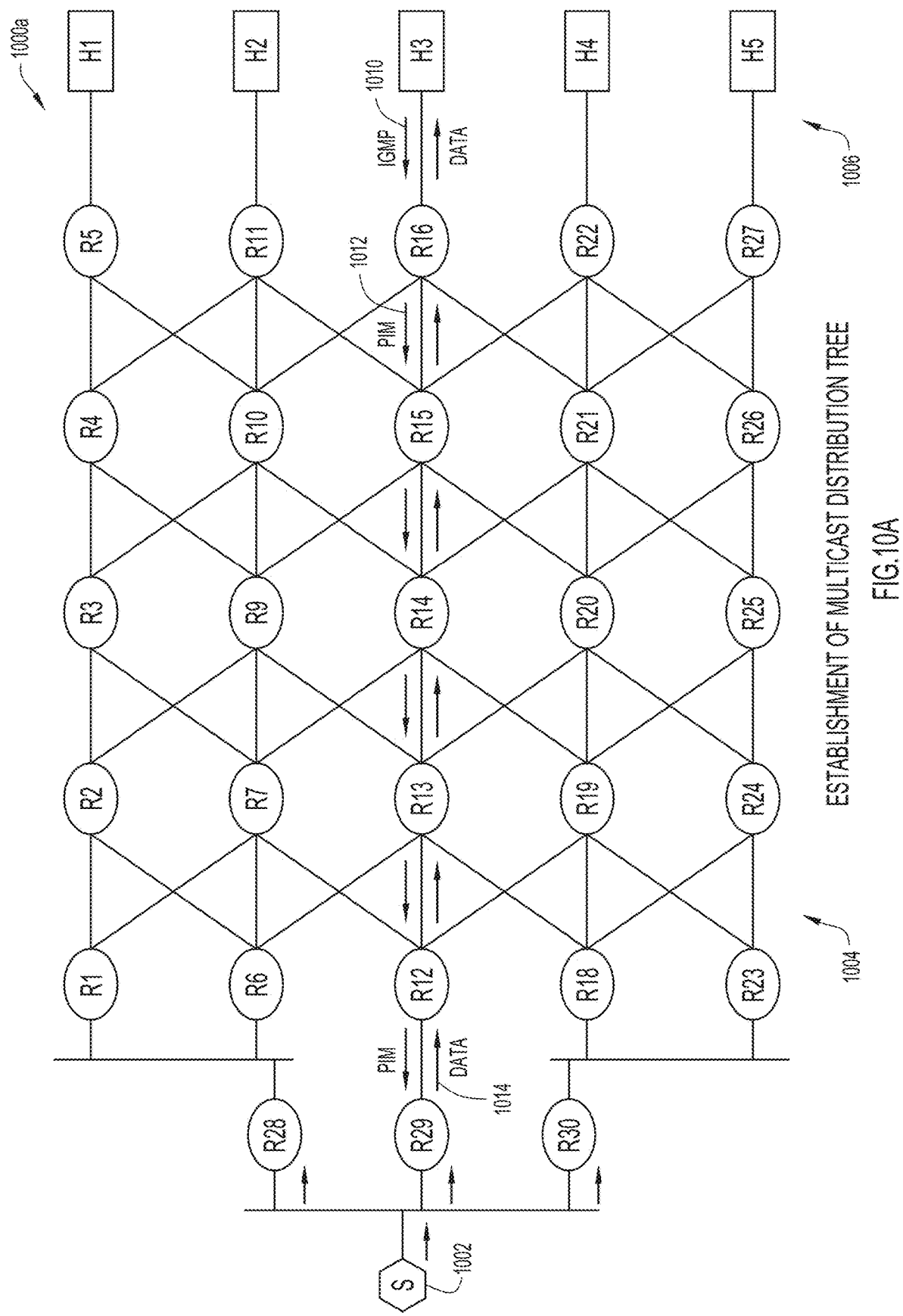

In the representation 1000a of FIG. 10A, when H3 sends a multicast membership request (e.g. IGMP) at 1010, the request gets converted by R16 to a PIM join in the PIM domain at 1012. The PIM join may travel hop-by-hop towards the source node 1002. IGP is relied upon for processing of the PIM join in order to provide the shortest or best path to reach the source prefix. Here, a multicast distribution tree which includes R29, R12, R13, R14, R15, and R16 is established for the delivery of multicast traffic data 1014 from source node 1002 to H3.

Figure 10B:
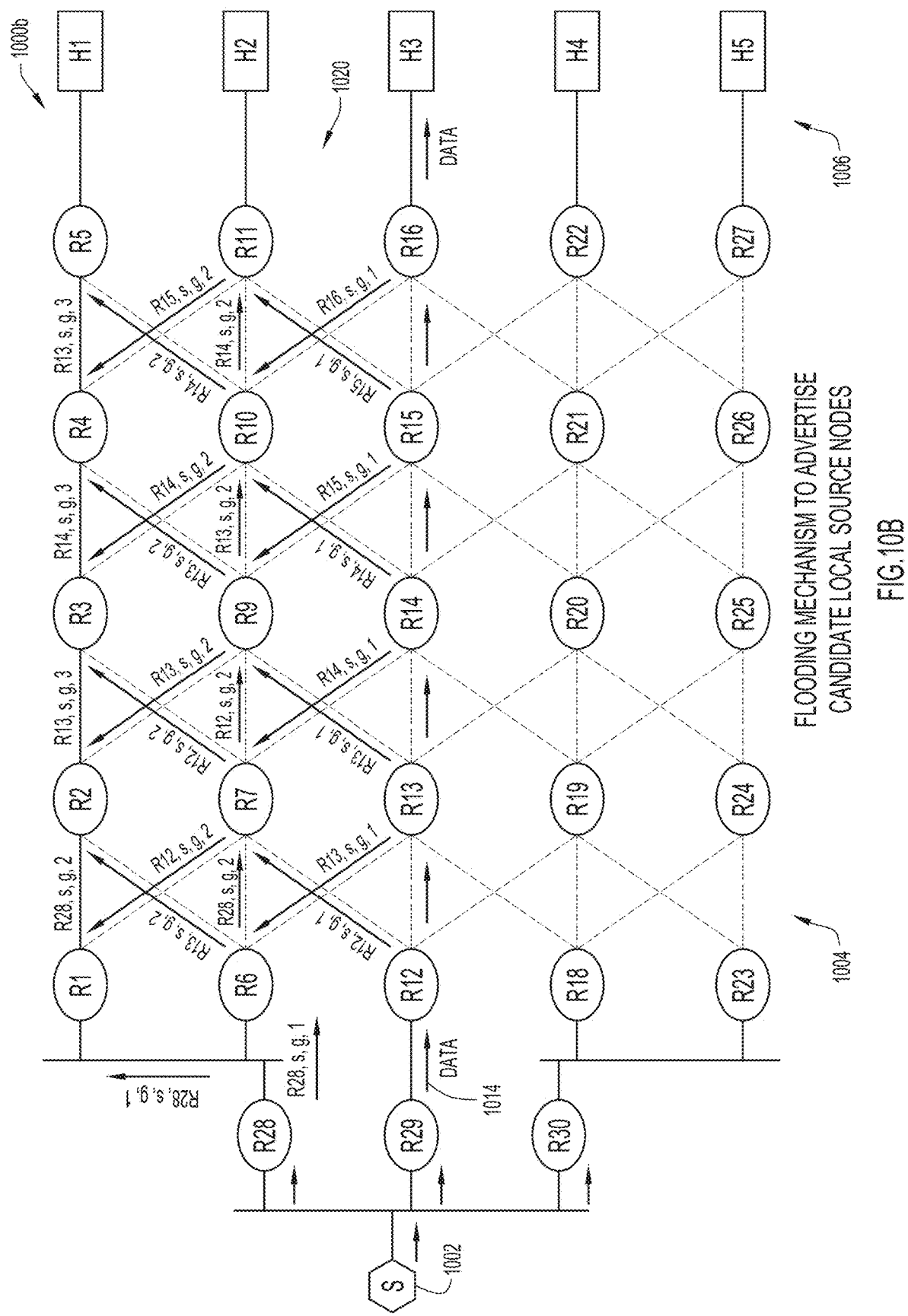

Continuing with the representation 1000b of FIG. 10B, it is indicated that a plurality of network nodes (e.g. R29, R12, R13, R14, R15, and R16) established as part of the multicast distribution tree may be elected and made available as candidate local source nodes. As part of a flooding mechanism of advertisement messages 1020, each network node may propagate to one or more adjacent nodes a message for advertising itself as a candidate local source node at which to join the multicast group to receive the multicast traffic from the source node 1002.

Each advertisement message includes data (e.g. a reachability metric) associated with the network node's availability as a candidate local source node for the multicast traffic. These data may be used by other network nodes (e.g. R5) in the network fabric to make decisions as to whether or not to use the candidate local source node (e.g. R14) for the multicast traffic, and/or to properly identify and join host receiver devices in the multicast group to receive the multicast traffic (see e.g. the description above in relation to FIG. 8A-8C). As indicated in the advertisements, the data may include an identifier or address of the candidate local source node of the tree, the source address, the multicast group address or identifier, and a metric to the candidate local source node (e.g. number of hops). Note that, in FIG. 10B, only the top half of nodes in the diagram is shown to receive advertisements for simplifying the illustration for clarity; however, the bottom half of nodes may also receive advertisements in the same or similar manner.

Continuing with the representation 1000c of FIG. 10C, when H1 starts sending a multicast membership request (e.g. IGMP) to R5 at 1030, R5 may select or determine the most optimal or suitable path for receiving multicast traffic data from the source node 1002. The selection or determination may be made by comparing reachability metrics (e.g. comparing the reachability metric of source node 1002 and the reachability metric of R14 which serves as a candidate local source node). Here, R5 may select the candidate local source node R14, since the reachability metric associated with R14 is small and less than the reachability metric associated with the source node 1002. R5 may convert the request at 1030 to a PIM join in the PIM domain at 1032 toward R14. The PIM join may be a PIM join message which includes a PIM RPF vector that specifies an IP address of R5. Here, it is not necessary to rely on IGP for processing of the PIM join to find the shortest path to source node 1002. As depicted, multicast traffic data from source node 1002 is provided to H1 from along the multicast distribution tree via R14 and then through R10 and R5.

Figure 10D:
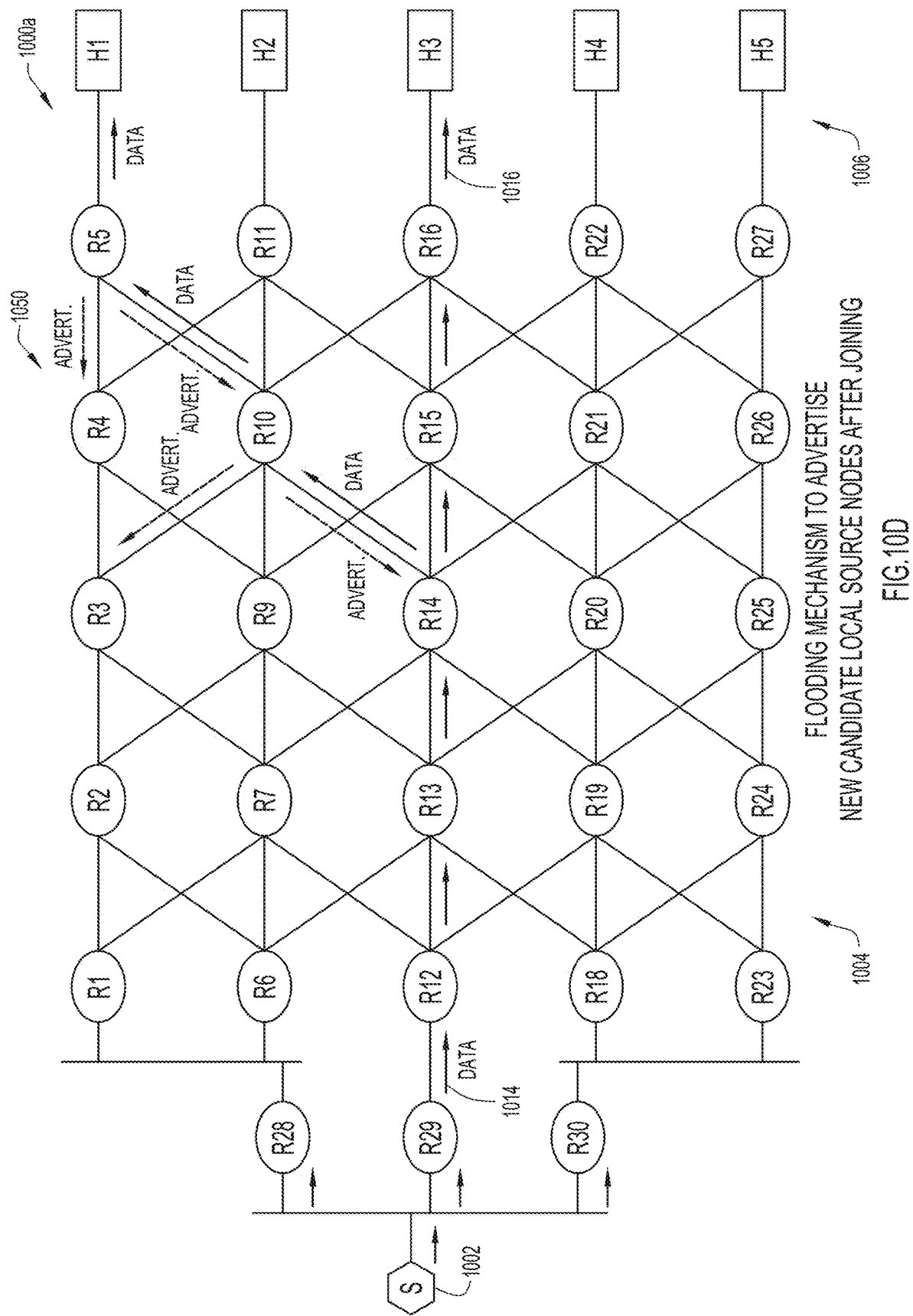

Continuing with the representation 1000d of FIG. 10D, additional network nodes (e.g. R10 and R5) that are established as part of a multicast distribution tree may be elected and made available as candidate local source nodes. As part of the flooding mechanism of advertisement messages 1050, each of these network nodes may propagate to one or more adjacent nodes a message for advertising itself as a candidate local source node at which to join the multicast group to receive the multicast traffic from the source node 1002.

Figure 11:
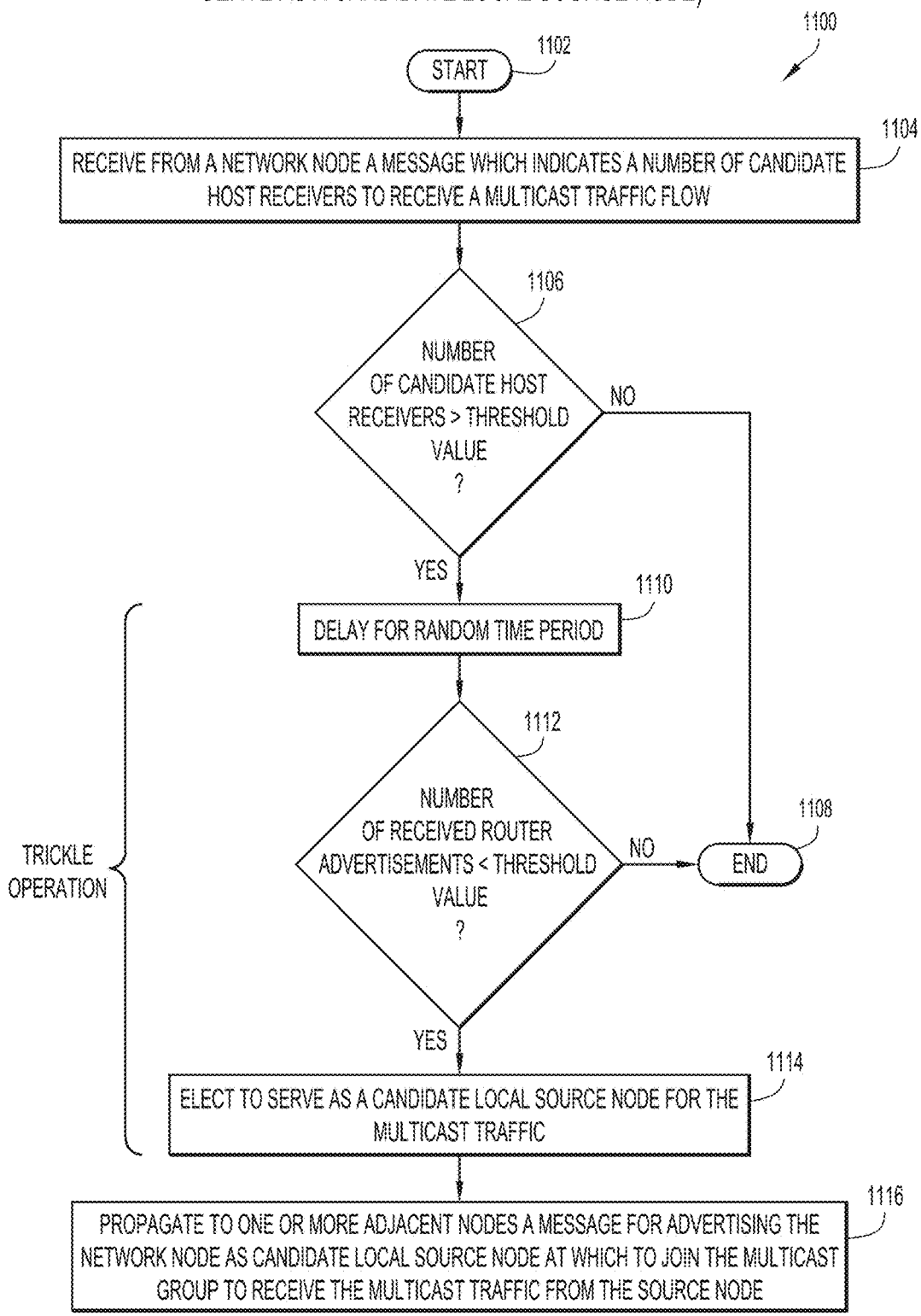
FIG. 11 is a flowchart for describing a method for use in IP multicast delivery with use of local source nodes and the propagation of advertisements therefor according to some implementations of the present disclosure, which may be performed by a network node (e.g. a router) and involve a "trickle" operation according to some implementations of the present disclosure.

FIG. 11 is a flowchart 1100 for describing a method for use in optimizing IP multicast traffic delivery with use of local source nodes according to some implementations of the present disclosure. The method of FIG. 11 may be for use in reducing the number of flooded advertisement messages and involve what may be characterized as a "trickle" operation. In some implementations, the technique may use similar or the same operations as described in *The Trickle Algorithm*, RFC 6206, P. Levis et al., March 2011, which is hereby incorporated by reference as though fully set forth herein.

The method of FIG. 11 may be performed by a network node (e.g. a router) for use in a network fabric which includes the plurality of interconnected network nodes. The network node may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the network node for performing the steps of the method.

Beginning at a start block 1102 of FIG. 11, the network node may receive from a network node a message which indicates a (e.g. total) number of candidate host receivers to receive a multicast traffic flow (step 1104 of FIG. 11). Here, listeners may advertise locally their intention to access the multicast traffic flow, which is done on their behalf by the network node which may be the first hop router. In some implementations, this step may be performed with use of a modified variation of *Population Count Extensions to Protocol Independent Multicast (PIM)*, RFC 6807, D. Farinacci et al., December 2012, which is hereby incorporated by reference as though fully set forth herein.

Next, the network node may test or otherwise identify whether the number of candidate host receivers to receive the multicast traffic is greater than a first threshold value (step 1106 of FIG. 11). If the network node identifies that the number of candidate host receivers is greater than the first threshold value, then the network node may continue to perform a trickle operation as indicated in the flowchart, but otherwise refrain from performing these steps where the method ends at an end block 1108 of FIG. 11.

In the trickle operation, the network node may delay for a random time period (step 1110 of FIG. 11). This step may be performed with use of a timer which is set to a random number that is selected within predetermined limits. The network node may run the timer and, upon expiration of the timer, the network node may identify whether the number of received network node advertisements is greater than a second threshold value (step 1112 of FIG. 11). The number of received network node advertisements may be those advertisements that are received, over the random time period, from other network nodes (see e.g. the description in relation to step 814 of FIG. 8A).

If the network node identifies that the number of received network node advertisements is greater than the second threshold value in step 1112, the network node may elect itself to be a candidate local source node (step 1114 of FIG. 11) and propagate a message for advertising the network node as a candidate local source node at which to join the multicast group to receive the multicast traffic from the source node (step 1116 of FIG. 11). If the network node identifies that the number of received network node advertisements is not greater than the second threshold value in step 1112, then the network router refrains from performing these steps and ends at the end block 1108.

Figure 12:
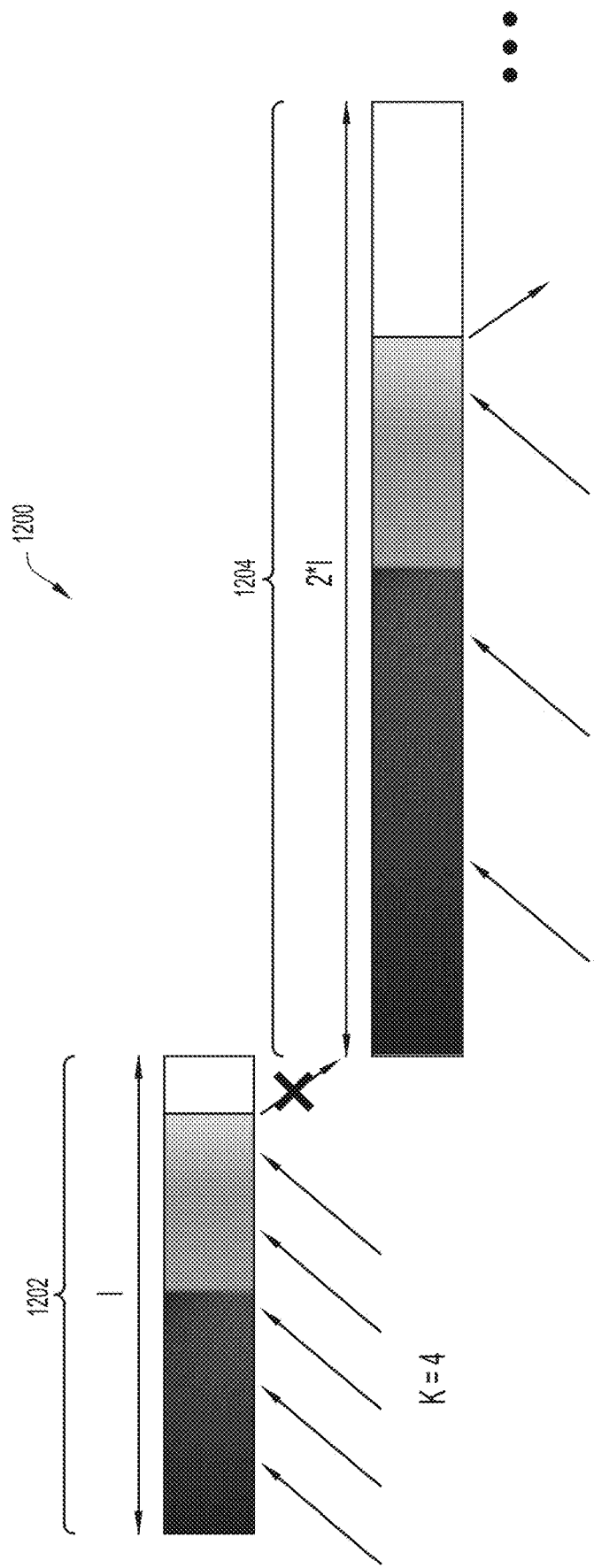
FIG. 12 is an illustrative diagram for describing aspects of the trickle operation.

FIG. 12 is an illustrative diagram 1200 for describing aspects of the trickle operation. In FIG. 12, two different timeframes 1202 and 1204 associated with the trickle operation are provided for illustration. The trickle operation may involve a suppression of redundant copies; that is, a network node may not send a copy if K copies (indicated by slanted arrows) have already been received (e.g. where K=4). The trickle operation may further involve the providing of "jitter" for collision avoidance. In FIG. 12, it is shown that a first portion of each timeframe is mute and a second (subsequently) portion of each timeframe is jittered. Further, the trickle operation may involve an exponential backoff algorithm (e.g. double "I" after a period of I; reset on inconsistency).

Figure 13:
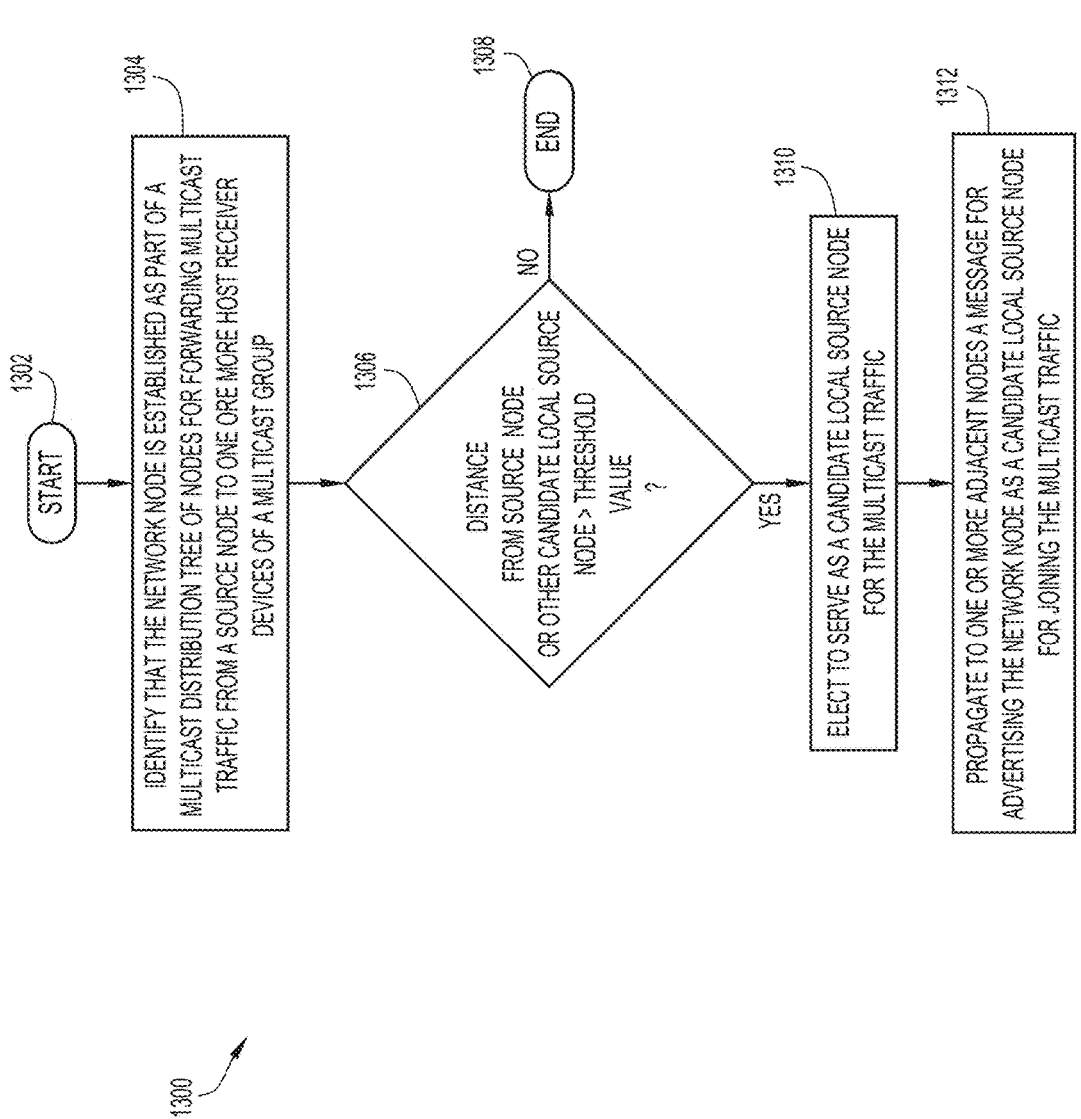
FIG. 13 is a flowchart for describing a method for use in IP multicast delivery with use of local source nodes and the propagation of advertisements therefor according to some implementations of the present disclosure, which may be performed by a network node (e.g. a router) which may serve as a local source node of a multicast distribution tree and be for use in reducing excessive flooding of advertisement messages.

FIG. 13 is a flowchart 1300 for describing a method for use in IP multicast delivery with use of local source nodes and the propagation of advertisements therefor according to some implementations of the present disclosure. The method of FIG. 13 may be performed by a network node (e.g. a router) which may serve as a local source node of a multicast distribution tree and be for use in reducing excessive flooding of advertisement messages. The network node may include one or more processors, one or more memories coupled to the one or more processors, and one or more network/communication interfaces or ports. The method may be embodied as a computer program product including a non-transitory computer readable medium and instructions stored in the computer readable medium, where the instructions are executable on one or more processors of the network node for performing the steps of the method.

Beginning at a start block 1302 of FIG. 13, the network node may identify that it is established as part of a multicast distribution tree of nodes for forwarding multicast traffic from a source node to one or more host receiver devices of a multicast group (step 1304 of FIG. 13). In response, the network node may identify whether a distance from the closest source (e.g. the source node or other candidate local source node) is greater than a threshold value (step 1306 of FIG. 13). If the network node identifies that the distance is greater than the threshold value at step 1306, then the network may elect itself as a candidate local source node for the multicast traffic (step 1310 of FIG. 13). Otherwise, the network node refrains from such election and the method proceeds to the end block 1308 of FIG. 13. If serving as the candidate local source node, the network node may propagate to one or more adjacent nodes a message for advertising the network node as a candidate local source node at which to join the multicast group to receive the multicast traffic from the source node (step 1312 of FIG. 13). Techniques may be employed to reduce the number of advertisement messages that are flooded in the network fabric with the flooding mechanism, as described earlier above in relation to FIG. 8A.

Figure 14A:
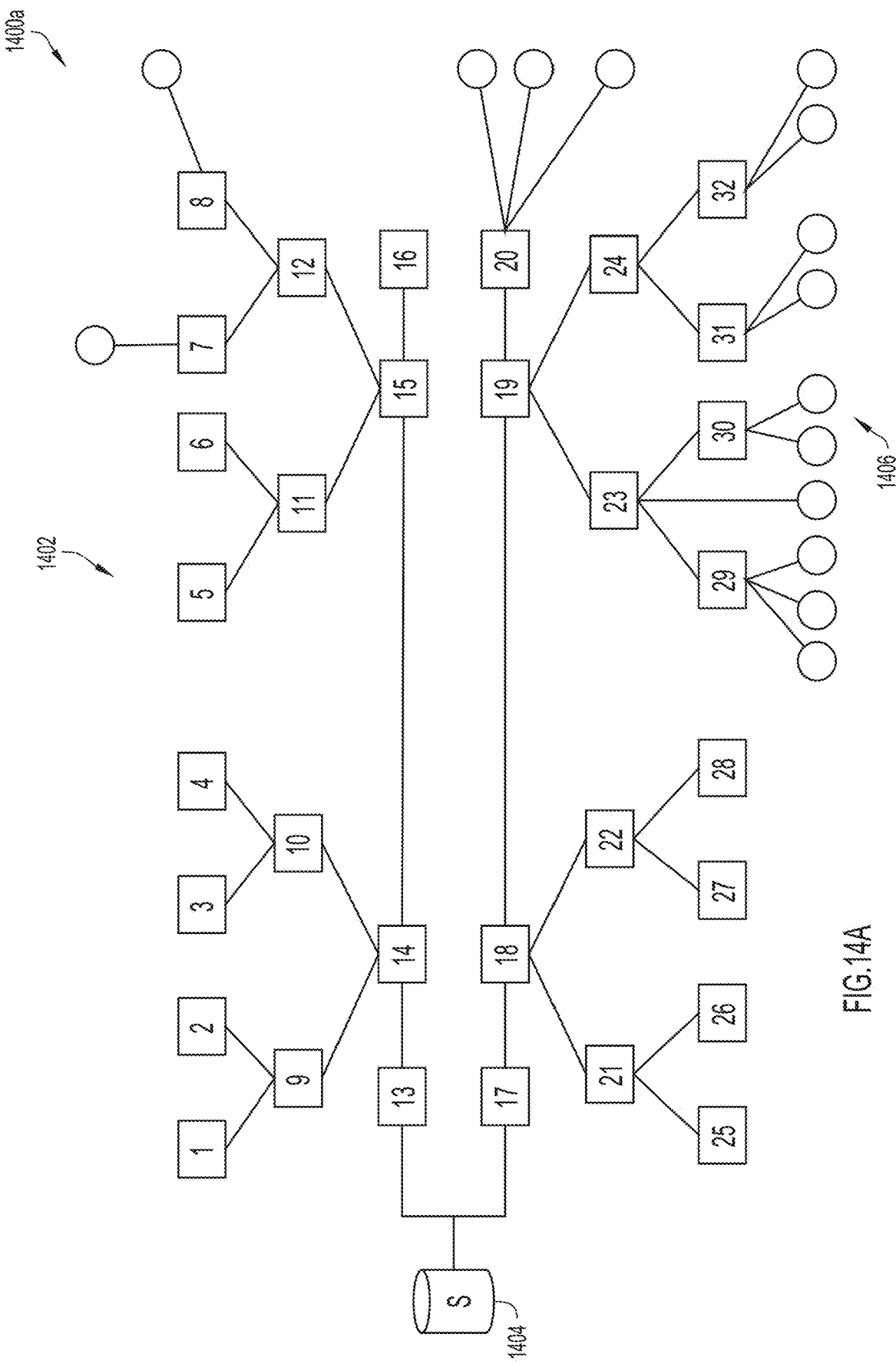
FIGS. 14A and 14B are illustrative representations of a network fabric which includes a plurality of interconnected network nodes (e.g. routers) configured for IP multicast delivery according to some implementations of the present disclosure, for use in describing an example scenario that results in a more optimal multicast traffic delivery and reduction of flooding.
Figure 14B:
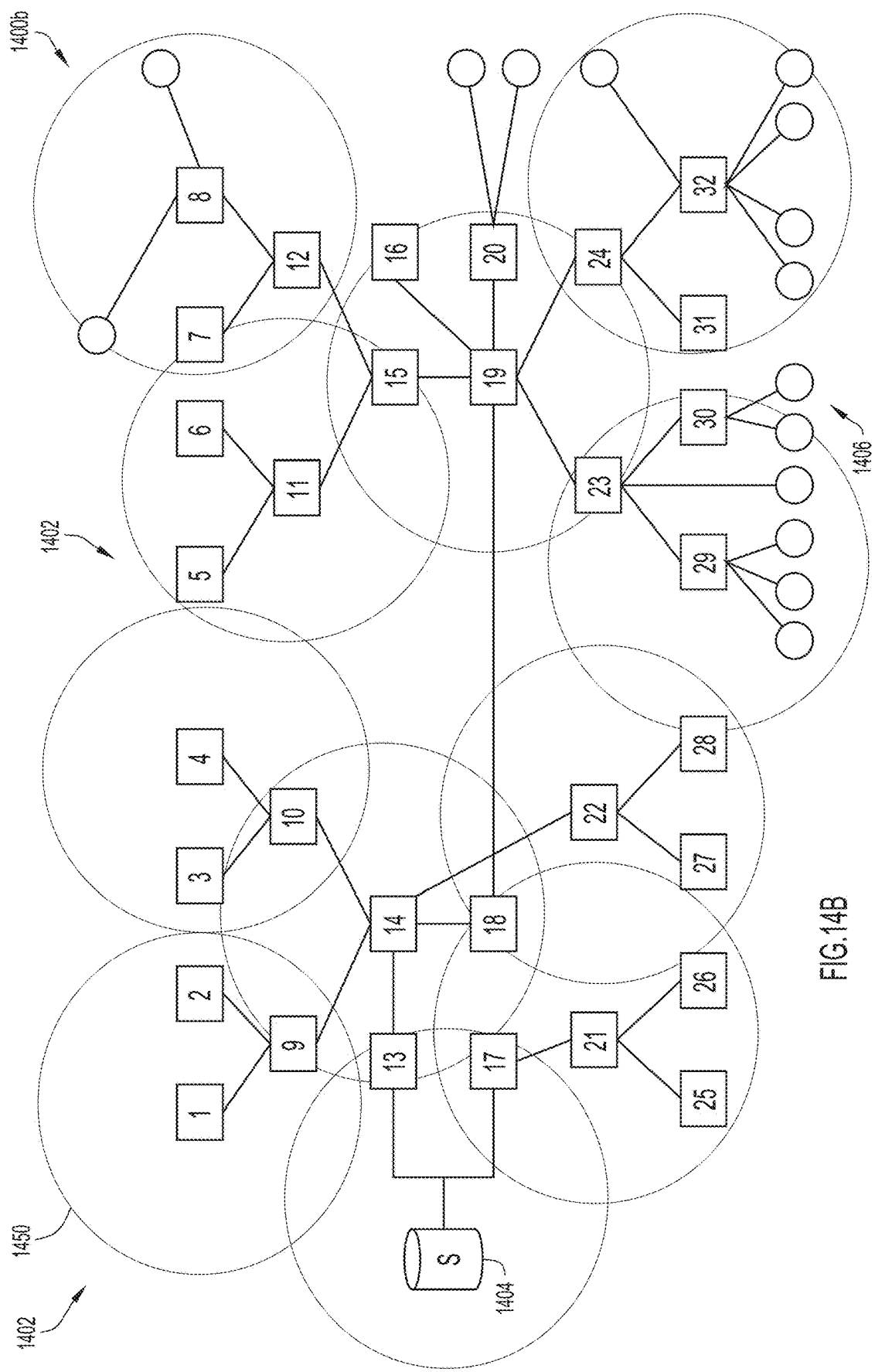

FIGS. 14A and 14B are illustrative representations 1400a, 1400b of a network fabric which includes a plurality of interconnected network nodes 1402 (e.g. routers) configured for IP multicast delivery according to some implementations of the present disclosure. These representations are for use in describing an example scenario that results in a more optimal multicast traffic delivery and reduction of PFM flooding (see e.g. the description in relation to the above figures, including FIGS. 11 and 13). In FIG. 14B, a plurality of circular ranges (e.g. a circular range 1450 around routers 1, 2, and 9) represent the range of PFM floods. The plurality of network nodes 1402 of the network fabric may include routers designated 1 through 32 as shown. A source node 1404 ("S") may be configured to provide a multicast traffic flow for a plurality of host receiver devices 1006.

Consider a first host receiver device or "listener" being attached to router 21. This would add routers 21 and 17 to the tree. Router 17 is too near to source node 1404 (illustrated as within S's circle) but router 21 is not; hence, router 21 may become a local source for the (S, G). When other listeners attach to routers 25 and 26, those heard about router 21 (i.e. the nearest local source) that is nearer than them to the source node 1404 so they may branch to it.

Then, a listener may attach to router 1. A PIM message may be forwarded along a shortest path first (SPF) route along routers 1, 9, 14 and 13 since there is no alternate visible source. Router 1 may become a local source and forward the PIM message. Router 9 is too near router 1; hence, router 9 does not become a local source. Router 9 does not branch to router 1 because router 1 is farther from the source node 1404. Router 14 may become a local source, but router 13 may not.

Then, a listener may attach to router 21 which may become a local source and forward the PIM message along RPF to router 17. Router 17 is too near to router 21 so it does not become a local source, and it may forward along RPF because the only visible source, router 21, is farther from the source node 1404.

Then, a listener attaches to router 4, which becomes a local source and forwards the PIM message along the RPF. The nearest source is router 10 so the PIM message may be sent towards router 10.

Then, a listener attaches to router 29, which becomes a local source and forwards the PIM message along the RPF. On the way, router 19 becomes a local source and forwards along RPF towards the source node 1404 since there is no other visible source. Router 18 does not become a local source since it is too near to router 14, and may forward it to router 14; the reason is that, although they are at an equal distance from the source node 1404, since router 18 is not a source, it can use router 10 without a loop. There may be a tie breaker for sources at an equal distance but it is only needed if both are sources.

The process continues as illustrated and understood. Note that routers 14 and 19 have become local attractors, and the shape of the tree has changed, avoiding the parallel copies along routers 12, 14, 15, 16 and 17, 18, 19, and 20.

Network balancing for different (S, G) SPF routings tends to force multicast traffic flows through main avenues and misuse other possible paths that are not the shortest. RPF inherits that behavior and makes it such that PIM uses the same avenues. In some implementations, in order to balance the various trees over the network fabric, an additional rule to a become source advertiser may be utilized. This rule may instruct that a hash of (S, G) and an ID (such as a loopback address) to be within a certain predetermined range. As a result, different routers may be elected for different S and different G, forming different trees.

FIG. 15 illustrates a block diagram of a network node (e.g. a router, an edge router, etc.) configured to perform operations described above according to some implementations. The network node 1500 includes one or more processors 1510 for control, memory 1520, a bus 1530 and a network processor unit 1540. The processor 1510 may be a microprocessor or microcontroller. The network processor unit 1540 may include one or more Application Specific Integrated Circuits (ASICs), linecards, etc., and facilitates network communications between the node 1500 and other network nodes.

There are a plurality of network ports 1542 at which the node 1500 receives packets and from which the node 1500 sends packets into the network. The processor 1510 executes instructions associated with software stored in memory 1520. Specifically, the memory 1520 stores instructions for control logic 1550 that, when executed by the processor 1510, causes the processor 1510 to perform various operations on behalf of the node 1500 as described herein. The memory 1520 also stores configuration information 1560 received from a network controller to configure the network node according to desired network functions. It should be noted that in some embodiments, the control logic 1550 may be implemented in the form of firmware implemented by one or more ASICs as part of the network processor unit 1540.

The memory 1520 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 1520 may comprise one or more tangible (non-transitory) computer readable storage media (e.g., a memory device) encoded with software comprising computer executable instructions and when the software is executed (by the processor 1510) it is operable to perform certain network node operations described herein.

Note that, although in some implementations of the present disclosure, one or more (or all) of the components, functions, and/or techniques described in relation to the figures may be employed together for operation in a cooperative manner, each one of the components, functions, and/or techniques may indeed be employed separately and individually, to facilitate or provide one or more advantages of the present disclosure.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are used to distinguish one element from another. For example, a first local source node could be termed a second local source node, and similarly, a second local source node could be termed a first local source node, without changing the meaning of the description, so long as all occurrences of the "first local source node" are renamed consistently and all occurrences of the "second local source node" are renamed consistently. The first local source node and the second local source node are both local source nodes, but they are not the same local source node.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context. Note that, in the description above, the term "if" may be replaced with "based on identifying that" or "in response to identifying that," a substitution of terminology which is understood and well within the scope of the techniques of the present disclosure.

The invention claimed is:

1. A method comprising:
    at a network node configured to connect in a network fabric of interconnected network nodes, and to be a part of a multicast distribution tree of nodes that forward multicast traffic originating from a source node to one or more host receiver devices of a multicast group,
        based on identifying that a number of host receiver devices that have locally advertised to receive the multicast traffic is a greater than a threshold value:
            electing to serve as a candidate local source node in the multicast distribution tree; and
            causing a message to be propagated to one or more adjacent network nodes in the network fabric for advertising the network node as the candidate local source node at which to join the multicast group to receive the multicast traffic.

2. The method of claim 1, wherein the message to be propagated is part of a flooding of messages in the network fabric for advertising the network node as the candidate local source node for joining the multicast group.

3. The method of claim 2, wherein the flooding of messages is compatible with Protocol Independent Multicast (PIM) flooding mechanism (PFM) and source discovery (SD) according to Request for Comments (RFC) 8364.

4. The method of claim 1, wherein the threshold value comprises a first threshold value, and the method further comprises:
    at the network node, based on identifying that the number of host receiver devices that have locally advertised to receive the multicast traffic is a greater than the first threshold value,
        delaying for a time period; and
        electing to serve as the candidate local source node and causing the message to be propagated for advertising further based on identifying that a number of received network node advertisements from other network nodes in the multicast distribution tree over the time period is less than a second threshold value.

5. The method of claim 4, which comprises a trickle operation, and wherein the time period comprises a random time period.

6. The method of claim 1, wherein the threshold value comprises a first threshold value, and the method further comprises:
    at the network node,
        identifying whether a distance between the network node and another network node which serves as the source node or candidate local source node in the multicast distribution tree is greater than a second threshold value; and
        electing to serve as the candidate local source node and propagating the message for advertising further based on identifying that the distance is greater than the second threshold value.

7. The method of claim 1, wherein the message for advertising the network node as the candidate local source node includes a scope value to limit propagation of the message, and a reachability metric comprising a number of hops to each the network node.

8. The method of claim 1, further comprising:
    at the network node, after causing the message to be propagated, receiving from an adjacent network node a join request for joining a host receiver device to the multicast group; and joining the host receiver device in the multicast group at the network node, for the host receiver device to receive the multicast traffic originating from the source node via the network node.

9. The method of claim 8, wherein the join request comprises a Protocol Independent Multicast (PIM) join message including a PIM reverse path forwarding (RPF) vector which specifies an IP address of an edge router to the host receiver device.

10. The method of claim 1, wherein the message includes a multicast source address associated with the source node, a multicast group address associated with the multicast group, and a loopback address associated with the network node.

11. A network node comprising:
one or more processors;
a plurality of interfaces configured to connect the network node in a network fabric of a plurality of network nodes;
the one or more processors being configured to:
establish the network node as part of a multicast distribution tree of nodes that forward multicast traffic originating from a source node to one or more host receiver devices of a multicast group;
identify that a number of host receiver devices that have locally advertised to receive the multicast traffic is a greater than a threshold value;
based on the identifying:
elect to serve as a candidate local source node in the multicast distribution tree; and
cause a message to be propagated to one or more adjacent network nodes in the network fabric for advertising the network node as the candidate local source node at which to join the multicast group to receive the multicast traffic.

12. The network node of claim 11, wherein the message to be propagated is part of a flooding of messages in the network fabric for advertising the network node as the candidate local source node for joining the multicast group.

13. The network node of claim 12, wherein the flooding of messages is compatible with Protocol Independent Multicast (PIM) flooding mechanism (PFM) and source discovery (SD) according to Request for Comments (RFC) 8364.

14. The network node of claim 11, wherein the threshold value comprises a first threshold value, and the one or more processors are further configured to:
based on identifying that the number of host receiver devices that have locally advertised to receive the multicast traffic is a greater than the first threshold value,
delay for a time period; and
elect to serve as the candidate local source node and cause the message to be propagated further based on identifying that a number of received network node advertisements from other network nodes in the multicast distribution tree over the time period is less than a second threshold value.

15. The network node of claim 14, which comprises a trickle operation, and wherein the time period comprises a random time period.

16. A method comprising:
at an edge router, configured to connect in a network fabric of interconnected network nodes which include first and second network nodes configured to be part of a multicast distribution tree of nodes that forward multicast traffic from a source node to one or more host receiver devices of a multicast group;
receiving a first message which advertises the first network node as a first candidate local source node at which to join the multicast group to receive the multicast traffic from the source node;
storing first data associated with the first message for advertising the first network node as the first candidate local source node, the first data including a first reachability metric comprising a first distance to the first candidate local source node;
receiving a second message which advertises the second network node as a second candidate local source node at which to join the multicast group to receive the multicast traffic from the source node; and
storing second data associated with the second message for advertising the second network node as the second candidate local source node, the second data including a second reachability metric comprising a second distance to the second candidate local source node.

17. The method of claim 16, wherein:
the first message is part of a first flooding of messages in the network fabric which advertise the first network node as the first candidate local source node for joining the multicast group, and
the second message is part of a second flooding of messages in the network fabric which advertise the second network node as the second candidate local source node for joining the multicast group.

18. The method of claim 16, wherein:
the first message includes a multicast source address associated with the source node, a multicast group address associated with the multicast group, and a first loopback address associated with the first network node, and
the second message includes the multicast source address associated with the source node, the multicast group address associated with the multicast group, and a second loopback address associated with the second network node.

19. The method of claim 16, wherein:
the first reachability metric associated with the first candidate local source node comprises a first number of hops to reach the first candidate local source node, and
the second reachability metric associated with the second candidate local source node comprises a second number of hops to reach the second candidate local source node.

20. The method of claim 16, further comprising:
receiving from a host receiver device a join request for joining a host receiver device to the multicast group;
comparing the first reachability metric associated with the first candidate local source node and the second reachability metric associated with the second candidate local source node;
selecting, based on the comparing, one of the first candidate local source node or the second candidate local source node based on the first reachability metric and the second reachability metric associated with the first and the second network nodes, respectively; and
causing the host receiver device to be joined in the multicast group at the selected one of the first candidate local source node or the second candidate local source node for the host receiver device to receive the multicast traffic of the multicast group.

* * * * *